United States Patent
Na et al.

(10) Patent No.: US 12,533,108 B2
(45) Date of Patent: Jan. 27, 2026

(54) WIRELESS ULTRASOUND PROBE AND CONTROL METHOD THEREOF

(71) Applicant: Samsung Medison Co., Ltd., Gangwon-do (KR)

(72) Inventors: Minsoo Na, Seoul (KR); Hwanseung Yu, Seoul (KR)

(73) Assignee: SAMSUNG MEDISON CO., LTD., Gangwon-Do (KR)

( * ) Notice: Subject to any disclaimer, the term of this patent is extended or adjusted under 35 U.S.C. 154(b) by 0 days.

(21) Appl. No.: 18/600,243

(22) Filed: Mar. 8, 2024

(65) Prior Publication Data
US 2025/0152136 A1    May 15, 2025

(30) Foreign Application Priority Data

Nov. 14, 2023 (KR) .................. 10-2023-0157696
Dec. 25, 2023 (KR) .................. 10-2023-0128530

(51) Int. Cl.
*A61B 8/00*     (2006.01)
*A61B 90/00*    (2016.01)

(52) U.S. Cl.
CPC .......... *A61B 8/4472* (2013.01); *A61B 8/4254* (2013.01); *A61B 8/54* (2013.01);
(Continued)

(58) Field of Classification Search
CPC ....... A61B 8/4472; A61B 8/4254; A61B 8/54; A61B 8/56; A61B 90/06;
(Continued)

(56) References Cited

U.S. PATENT DOCUMENTS 7,328,615 B2    2/2008    Kwon et al.
9,554,778 B2    1/2017    Wong et al.
(Continued)

FOREIGN PATENT DOCUMENTS

JP          3315936 B2        8/2002
JP       2003-190154 A        7/2003
(Continued)

OTHER PUBLICATIONS

The Extended European Search Report dated Jul. 17, 2024 issued in European Patent Application No. 24158263.4.
(Continued)

*Primary Examiner* — Alexei Bykhovski
(74) *Attorney, Agent, or Firm* — Morgan Lewis & Bockius LLP

(57) ABSTRACT

Provided are a wireless ultrasound probe and a control method thereof, and in particular, a wireless ultrasound probe and a control method thereof, the wireless ultrasound probe including a battery circuit, a switching circuit, a pulse circuit, a transducer, a capacitor, and a discharge module, wherein the switching circuit is configured to generate a high voltage used by the pulse circuit to output a transmission signal and store the high voltage in the capacitor, and the discharge module is configured to detect whether a first event has occurred that causes damage to the wireless ultrasound probe due to the high voltage stored in the capacitor, and in response to detecting the first event, start a discharge operation for discharging the high voltage stored in the capacitor.

16 Claims, 22 Drawing Sheets

(52) U.S. Cl.
CPC ............... *A61B 8/56* (2013.01); *A61B 90/06* (2016.02); *A61B 2090/0809* (2016.02); *A61B 2562/029* (2013.01)

(58) Field of Classification Search
CPC ...... A61B 2090/0809; A61B 2562/029; A61B 8/4245; A61B 8/4405; A61B 8/4427; G01S 7/52096
See application file for complete search history.

(56) References Cited

U.S. PATENT DOCUMENTS

| | | | |
|---|---|---|---|
| 9,775,585 | B2 | 10/2017 | Miller |
| 10,702,249 | B2 | 7/2020 | Jin et al. |
| 2008/0064955 | A1* | 3/2008 | Miyajima ............... A61B 8/546 600/437 |
| 2011/0092820 | A1 | 4/2011 | Hyeon |
| 2013/0312530 | A1 | 11/2013 | Kawaguchi |
| 2015/0245823 | A1* | 9/2015 | Jin ........................... A61B 8/14 600/443 |
| 2016/0374645 | A1 | 12/2016 | Kim et al. |
| 2018/0089845 | A1 | 3/2018 | Shin et al. |
| 2018/0289361 | A1* | 10/2018 | Ledoux ................. B06B 1/0246 |
| 2019/0110777 | A1 | 4/2019 | Lee et al. |
| 2022/0061820 | A1* | 3/2022 | Mandwal ............. A61B 8/4472 |
| 2022/0225959 | A1* | 7/2022 | Bharat ................. A61B 8/4263 |
| 2023/0285006 | A1* | 9/2023 | Petersen ............... A61B 8/485 |

FOREIGN PATENT DOCUMENTS

| | | |
|---|---|---|
| KR | 10-0618866 B1 | 8/2006 |
| KR | 10-1222848 B1 | 1/2013 |
| KR | 10-2013-0063790 A | 6/2013 |
| KR | 5575907 B2 | 7/2014 |
| KR | 10-2014-0144633 A | 12/2014 |
| KR | 10-1515809 B1 | 5/2015 |
| KR | 10-2015-0102590 A | 9/2015 |
| KR | 10-1603071 B1 | 3/2016 |

OTHER PUBLICATIONS

European Office Action dated Jul. 15, 2025 issued in European Patent Application No. 24158263.4.

\* cited by examiner

WIRELESS ULTRASOUND PROBE AND CONTROL METHOD THEREOF

CROSS-REFERENCE TO RELATED APPLICATION

This application is based on and claims priority under 35 U.S.C. § 119 to Korean Patent Application Nos. 10-2023-0128530 and 10-2023-0157696, respectively filed on Sep. 25, 2023 and Nov. 14, 2023, in the Korean Intellectual Property Office, the disclosures of which are incorporated by reference herein in their entireties.

BACKGROUND

1. Field

The disclosure relates to a wireless ultrasound probe and a control method thereof. More particularly, the disclosure relates to a wireless ultrasound probe and a control method thereof for reducing damage caused by stored high voltage when an event occurs.

2. Description of the Related Art

Recently, in the medical field, various types of medical imaging apparatuses have been widely used to visualize and obtain information about living tissue of a human body for early diagnosis or surgery with regard to various diseases. Representative examples of these medical imaging apparatuses may include an ultrasound imaging apparatus, a computed tomography (CT) apparatus, and a magnetic resonance imaging (MRI) apparatus.

Ultrasound imaging apparatuses transmit ultrasound signals generated by transducer elements of a probe to an object and receive information of signals reflected from the object, thereby obtaining at least one image of an internal part (e.g., soft tissue or blood flow) of the object. Ultrasound imaging apparatuses are used for medical purposes including observing an internal area of an object, detecting foreign substances, and assessing injuries. Such ultrasound imaging apparatuses exhibit high stability, are capable of displaying images in real time, and are safe due to lack of radiation exposure, as compared to X-ray apparatuses, and therefore, have been widely used together with other types of imaging diagnostic apparatuses.

A probe of an ultrasound imaging apparatus may use a high voltage to transmit an ultrasound signal to an object. The probe may transmit a transmission signal including a pulse voltage to a transducer. The probe may store high voltage in a capacitor to generate a pulse voltage. When events such as a change in a bias voltage, a fall, and water leakage occur to the probe while high voltage is stored in the capacitor, the probe may be damaged due to the stored high voltage.

SUMMARY

Additional aspects will be set forth in part in the description which follows and, in part, will be apparent from the description, or may be learned by practice of the presented embodiments of the disclosure.

A wireless ultrasound probe according to the disclosure may include a battery circuit, a switching circuit electrically connected to the battery circuit, a pulse circuit electrically connected to the switching circuit to output a transmission signal including a pulse voltage, a transducer configured to transmit an ultrasound signal to an object by receiving the transmission signal, a capacitor electrically connected to the pulse circuit, and a discharge module electrically connected to the capacitor. According to an embodiment, the switching circuit may be configured to generate a high voltage used by the pulse circuit to output the transmission signal and store the high voltage in the capacitor. According to an embodiment, the discharge module may be configured to detect whether a first event has occurred that causes damage to the wireless ultrasound probe due to the high voltage stored in the capacitor. According to an embodiment, in response to detecting the first event, the discharge module may be configured to start a discharge operation for discharging the high voltage stored in the capacitor.

A control method of a wireless ultrasound probe according to the disclosure may include generating, by the wireless ultrasound probe, a high voltage for outputting a transmission signal and storing the high voltage in a capacitor. The control method of the wireless ultrasound probe may include detecting, by the wireless ultrasound probe, whether a first event has occurred that causes damage to the wireless ultrasound probe due to the high voltage stored in the capacitor. The control method of the wireless ultrasound probe may include, in response to detecting the first event, starting, by the wireless ultrasound probe, a discharge operation for discharging the high voltage stored in the capacitor.

BRIEF DESCRIPTION OF THE DRAWINGS

The above and other aspects, features, and advantages of certain embodiments of the disclosure will be more apparent from the following description taken in conjunction with the accompanying drawings, wherein reference numerals denote structural elements, and in which.

DETAILED DESCRIPTION

Figure 1A:
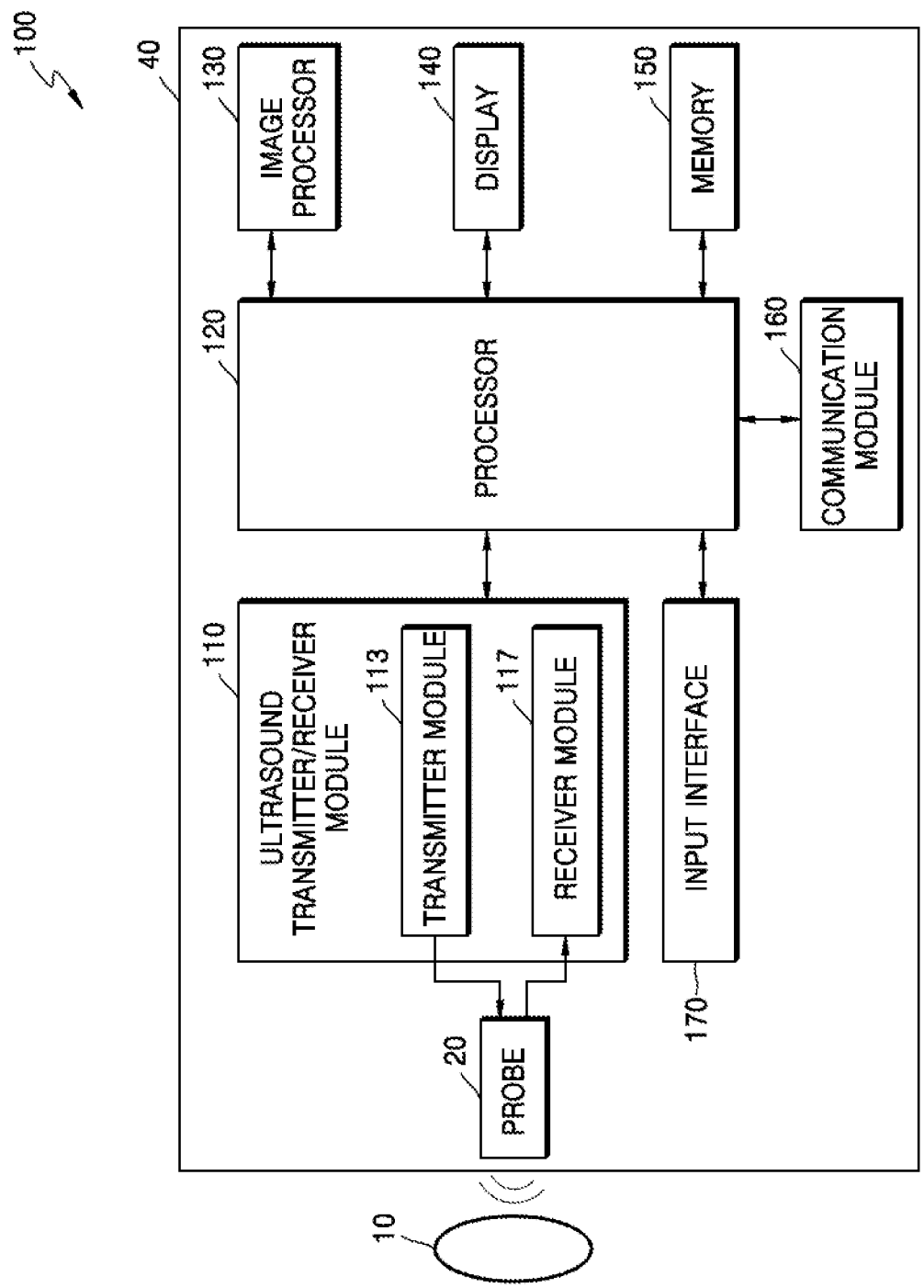
FIGS. 1A and 1B are block diagrams of configurations of an ultrasound imaging system according to an embodiment.

The present specification describes principles of the disclosure and sets forth embodiments thereof to clarify the scope of the claims of the disclosure and to allow one of ordinary skill in the art to implement the embodiments. The embodiments may be implemented in various forms.

Like reference numerals refer to like elements throughout the specification. This specification does not describe all elements of the embodiments, and general knowledge in the art to which the disclosure belongs or descriptions overlapping between the embodiments will be omitted. As used in herein, the term "module" or "unit" may be implemented in one or a combination of two or more of software, hardware, or firmware, and in some embodiments, a plurality of "modules" or "units" may be implemented as a single element, or a single "module" or "unit" may include a plurality of elements.

A singular form of a noun corresponding to an item may include one or a plurality of the items unless the context clearly indicates otherwise.

As used herein, each of the phrases such as "A or B," "at least one of A and B, "at least one of A or B," "A, B, or C," "at least one of A, B, and C," and "at least one of A, B, or C" may include any one of the items listed together in a corresponding one of the phrases, or all possible combinations thereof.

The term "and/or" includes any combination of a plurality of associated elements listed, or any one of the plurality of associated listed elements.

Terms such as "first," "second," etc. may be used simply to distinguish an element from other elements and do not limit the elements in any other respect (e.g., importance or order).

Moreover, as used in the disclosure, the terms "front," "rear," "top," "bottom," "side," "left," "right," "upper," "lower," etc. are defined based on the drawings, and the shape and position of each component are not limited by these terms.

The terms such as "comprise," "include," or "have" are intended to specify the presence of stated features, numbers, steps, operations, elements, components, or combinations thereof, but do not preclude the presence or addition of one or more other features, numbers, steps, operations, elements, components, or combinations thereof.

It will also be understood that when an element is referred to as "connected," "coupled," "supported," or "in contact" with another element, this includes not only when the elements are directly connected, coupled, supported, or in contact, but also when they are indirectly connected, coupled, supported, or in contact via a third element.

It will also be understood that when an element is referred to as being "on" another element, the element may be directly on the other element, or intervening elements may also be present therebetween.

Hereinafter, ultrasound apparatuses according to various embodiments will be described in detail with reference to the accompanying drawings. In the following description with reference to the accompanying drawings, identical or corresponding components are assigned like reference numbers drawing numbers, and repeated descriptions thereof may be omitted.

In the present specification, an image may include a medical image obtained by a medical imaging apparatus such as a magnetic resonance imaging (MRI) apparatus, a computed tomography (CT) apparatus, an ultrasound imaging apparatus, or an X-ray apparatus.

As used herein, an 'object' is a target to be imaged, and may include a human, an animal, or a part thereof. For example, the object may include a part of a body (organ, tissue, or the like), or a phantom.

Throughout the specification, an 'ultrasound image' refers to an image of an object generated or processed based on ultrasound signals transmitted to the object and reflected therefrom.

Figure 1B:
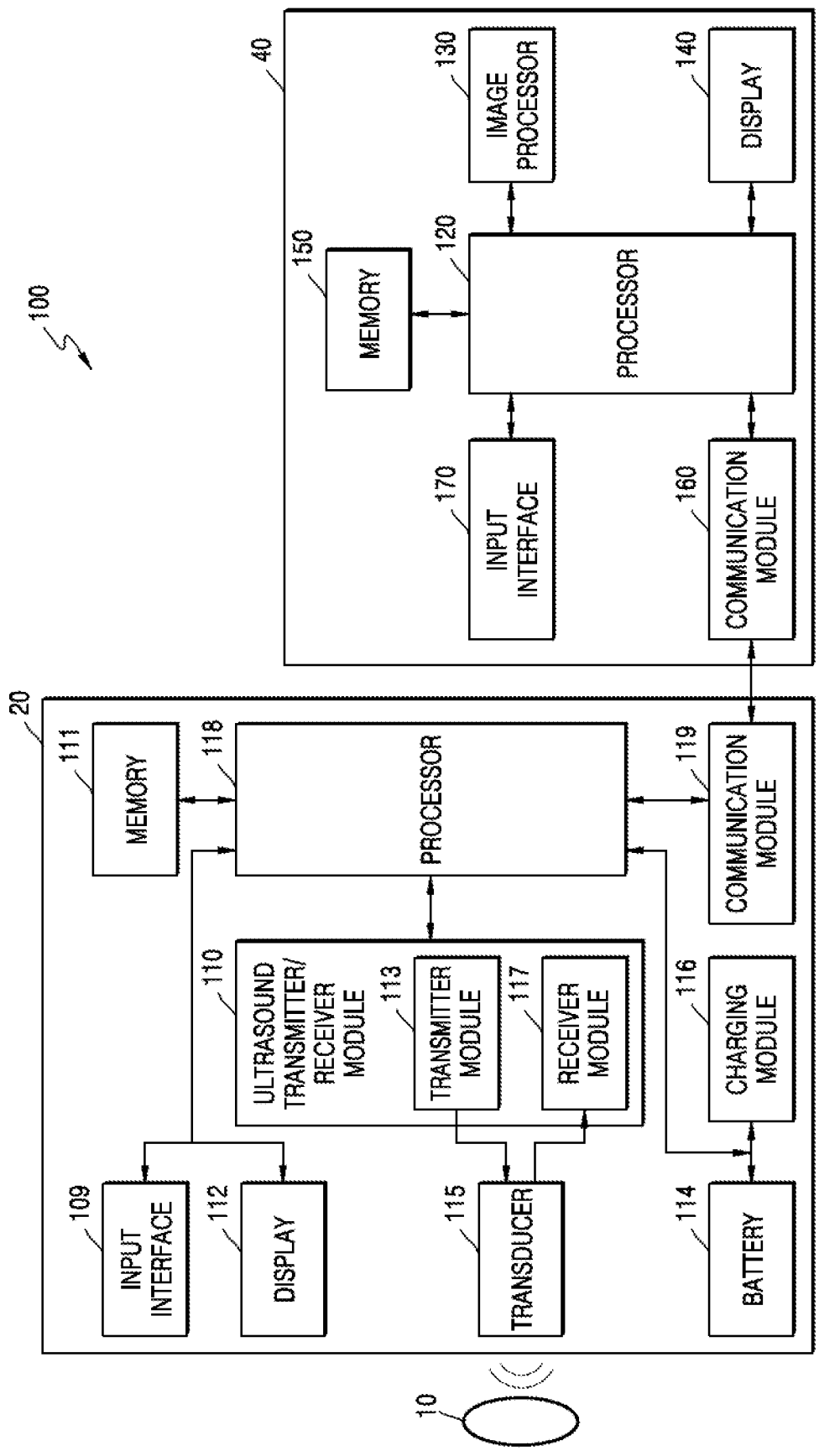

FIGS. 1A and 1B are block diagrams of configurations of an ultrasound imaging system according to an embodiment.

Referring to FIGS. 1A and 1B, an ultrasound imaging system 100 may include a probe 20 and an ultrasound imaging apparatus 40.

The ultrasound imaging apparatus 40 may be implemented not only as a cart-type ultrasound imaging apparatus but also as a portable ultrasound imaging apparatus. Examples of the portable ultrasound imaging apparatus may include, but are not limited to, a smartphone, a laptop computer, a personal digital assistant (PDA), a tablet personal computer (PC), etc., each of which includes a probe and an application. The ultrasound imaging apparatus 40 may be formed integrally with the probe 20.

The probe 20 may include a wired probe that is connected to the ultrasound imaging apparatus 40 by wire to communicate with the ultrasound imaging apparatus 40 by wire, a wireless probe that is wirelessly connected to the ultrasound imaging apparatus 40 to communicate wirelessly with the ultrasound imaging apparatus 40, and/or a hybrid probe that is connected to the ultrasound imaging apparatus 40 by wire or wirelessly to communicate with the ultrasound imaging apparatus 40 by wire or wirelessly.

According to various embodiments, the ultrasound imaging apparatus 40 may include an ultrasound transmitter/receiver module 110 as shown in FIG. 1A, or the probe 20 may include the ultrasound transmitter/receiver module 110 as shown in FIG. 1B. According to various embodiments, the ultrasound imaging apparatus 40 and the probe 20 may both include the ultrasound transmitter/receiver module 110.

According to various embodiments, the probe 20 may further include at least one of an image processor 130, a display 140, or an input interface 170, or a combination thereof. In the disclosure, descriptions of the ultrasound transmitter/receiver module 110, the image processor 130, the display 140, or the input interface 170 included in the ultrasound imaging apparatus 40 may also apply to the ultrasound transmitter/receiver module 110, the image processor 130, the display 140, or the input interface 170 included in the probe 20.

FIG. 1A is a block diagram of a configuration of the ultrasound imaging system 100 when the probe 20 is a wired probe or a hybrid probe.

The probe 20 may include a plurality of transducer elements. The plurality of transducer elements are arranged in a predetermined array, forming a transducer array. The transducer array may correspond to a one-dimensional (1D) array or a two-dimensional (2D) array. The plurality of transducer elements may transmit ultrasound signals to an object 10 in response to transmission signals applied from a transmitter module 113. The plurality of transducer elements may receive ultrasound (echo) signals reflected from the object 10 to form reception signals. Furthermore, the probe 20 may be formed integrally with the ultrasound imaging apparatus 40, or may be implemented as a separate part connected to the ultrasound imaging apparatus 40 in a wired manner. In addition, the ultrasound imaging apparatus 40 may be connected to one or a plurality of probes 20 according to its implemented configuration.

When the probe 20 is a wired probe or hybrid probe, the probe 20 may include a cable and a connector that are connectable to a connector of the ultrasound imaging apparatus 40.

According to an embodiment, the probe 20 may be implemented as a 2D probe. When the probe 20 is implemented as a 2D probe, the plurality of transducer elements included in the probe 20 may be arranged in two dimensions to form a 2D transducer array.

For example, the 2D transducer array may include a plurality of sub-arrays, each of the plurality of sub-arrays including a plurality of transducer elements arranged in a first direction, wherein the plurality of sub-arrays are arranged in a second direction that is different from the first direction.

Furthermore, according to an embodiment, when the probe 20 is implemented as a 2D probe, the ultrasound transmitter/receiver module 110 may include at least one of an analog beamformer or a digital beamformer. Further, according to an embodiment, the 2D probe may include at least one of an analog beamformer or a digital beamformer, or a combination thereof, according to its implemented configuration.

The processor 120 may control the transmitter module 113 to form transmission signals to be respectively applied to the plurality of transducer elements based on positions and a focal point of the plurality of transducer elements.

The processor 120 may control the receiver module 117 to perform analog-to-digital conversion (ADC) on the reception signals received from the probe 20 and generate ultrasound data by summing the digital reception signals based on positions and a focal point of the plurality of transducer elements.

When the probe 20 is implemented as a 2D probe, the processor 120 may calculate a time delay value for digital beamforming with respect to each of the plurality of sub-arrays included in the 2D transducer array. Also, the processor 120 may calculate a time delay value for analog beamforming for each of the plurality of transducer elements included in any one of the plurality of sub-arrays. The processor 120 may control the analog beamformer and the digital beamformer to form a transmission signal to be applied to each of the plurality of transducer elements based on time delay values for analog beamforming and digital beamforming. The processor 120 may also control the analog beamformer to sum signals received from the plurality of transducer elements for each sub-array according to the time delay values for analog beamforming. Furthermore, the processor 120 may control the ultrasound transmitter/receiver module 110 to perform ADC on the resulting sum signal for each sub-array. In addition, the processor 120 may control the digital beamformer to generate ultrasound data by summing the digital output signals according to the time delay values for digital beamforming.

The image processor 130 generates or processes an ultrasound image by using the generated ultrasound data.

The display 140 may display the generated ultrasound image and various pieces of information processed by the ultrasound imaging apparatus 40 or the probe 20. The probe 20 or the ultrasound imaging apparatus 40 may include one or a plurality of displays 140 depending on its implemented configuration. Furthermore, the display 140 may include a touch panel or a touch screen. The display 140 may also include a flexible display.

The processor 120 may control all operations of the ultrasound imaging apparatus 40 and operations of components of the ultrasound imaging apparatus 40. The processor 120 may execute programs or instructions stored in the memory 150 to perform or control various operations or functions of the ultrasound imaging apparatus 40. The processor 120 may also receive a control signal from the input interface 170 or an external device to control an operation of the ultrasound imaging apparatus 40.

The ultrasound imaging apparatus 40 includes the communication module 160 via which it may be connected to and communicate with external devices (e.g., servers, medical devices, and portable devices such as smartphones, tablet PCs, wearable devices, etc.).

The communication module 160 may include at least one component that enables communication with an external device. The communication module 160 may include, for example, at least one of a short-range communication module, a wired communication module, or a wireless communication module.

The communication module 160 may receive a control signal and data from an external device. The processor 120 may control an operation of the ultrasound imaging apparatus 40 in response to the control signal received via the communication module 160. Furthermore, the processor 120 may transmit a control signal to an external device via the communication module 160 to control the external device in response to the transmitted control signal. The external device may operate in response to a control signal received from the ultrasound imaging apparatus 40, or process data received from the ultrasound imaging apparatus 40.

A program or application related to the ultrasound imaging apparatus 40 may be installed on the external device. The program or application installed on the external device may control the ultrasound imaging apparatus 40, or run in response to a control signal or data received from the ultrasound imaging apparatus 40.

The external device may receive or download the program or application related to the ultrasound imaging apparatus 40 from the ultrasound imaging apparatus 40, the probe 20, or a server, and install and execute the program or application thereon. The ultrasound imaging apparatus 40, the probe 20, or the server providing a program or application may include a recording medium storing instructions, commands, installation files, executable files, or related data of the program or application. External devices may also be sold with programs or applications installed.

The memory 150 may store various types of data or programs for driving and controlling the ultrasound imaging apparatus 40, input and/or output ultrasound data, ultrasound images, etc.

The input interface 170 may receive a user input for controlling the ultrasound imaging apparatus 40. For example, the user input may include, but is not limited to, inputs for manipulating buttons, keypads, mice, trackballs, jog switches, or knops, an input for touching a touchpad or a touch screen, a voice input, a motion input, and an input of biometric information (e.g., iris recognition, fingerprint recognition, etc.).

FIG. 1B is a control block diagram of a configuration of the ultrasound imaging system 100 when the probe 20 is a wireless probe or a hybrid probe.

According to various embodiments, the ultrasound imaging apparatus 40 shown in FIG. 1B may be replaced with the ultrasound imaging apparatus 40 described with reference to FIG. 1A.

According to various embodiments, the probe shown in FIG. 1A may be replaced with the probe 20 to be described with reference to FIG. 1B.

The probe 20 may include a display 112, a transmitter module 113, a battery 114, a transducer 115, a charging module 116, a receiver module 117, an input interface 109, a processor 118, and a communication module 119. Although FIG. 1B shows that the probe 20 includes both the transmitter module 113 and the receiver module 117, according to its implemented configuration, the probe 20 may include only some of the components of the transmitter module 113 and the receiver module 117, and the ultrasound imaging apparatus 40 may also include some of the components of the transmitter module 113 and the receiver module 117. In addition, the probe 20 may further include the image processor 130.

The transducer 115 may include a plurality of transducer elements. The plurality of transducer elements are arranged in a predetermined array, forming a transducer array. The transducer array may correspond to a 1D array or a 2D array. The plurality of transducer elements may transmit ultrasound signals to an object 10 in response to transmission signals applied from the transmitter module 113. Furthermore, the plurality of transducer elements may receive ultrasound signals reflected from the object 10 to form or generate electrical reception signals.

The charging module 116 may charge the battery 114. The charging module 116 may receive power from an external source. According to an embodiment, the charging module 116 may receive power wirelessly. Furthermore, according to an embodiment, the charging module 116 may receive power by wire. The charging module 116 may transmit the received power to the battery 114.

The processor 118 may control the transmitter module 113 to generate or form transmission signals to be respectively applied to the plurality of transducer elements, based on positions and a focal point of the plurality of transducer elements.

The processor 118 may control the receiver module 117 to perform ADC on the reception signals received from the transducer 115 and generate ultrasound data by summing the digital reception signals based on positions and a focal point of the plurality of transducer elements. According to an embodiment, when the probe 20 includes the image processor 130, the image processor 130 may generate an ultrasound image based on the generated ultrasound data.

When the probe 20 is implemented as a 2D probe, the processor 118 may calculate a time delay value for digital beamforming with respect to each of the plurality of sub-arrays included in the 2D transducer array. Also, the processor 118 may calculate a time delay value for analog beamforming for each of the plurality of transducer elements included in any one of the plurality of sub-arrays. The processor 118 may control an analog beamformer and a digital beamformer to form transmission signals to be respectively applied to the plurality of transducer elements based on time delay values for analog beamforming and digital beamforming. The processor 118 may also control the analog beamformer to sum signals received from the plurality of transducer elements for each sub-array according to the time delay values for analog beamforming. Furthermore, the processor 118 may control the ultrasound transmitter/receiver module 110 to perform ADC on the resulting sum signal for each sub-array. In addition, the processor 118 may control the digital beamformer to generate ultrasound data by summing the digital output signals according to the time delay values for digital beamforming.

The processor 118 may control all operations of the probe 20 and operations of components of the probe 20. The processor 118 may execute programs or instructions stored in the memory 111 to perform or control various operations or functions of the probe 20. The processor 118 may also receive a control signal from the input interface 109 of the probe 20 or an external device (e.g., the ultrasound imaging apparatus 40) to control an operation of the probe 20. The processor 118 may also receive a control signal from the input interface 109 or an external device to control an operation of the probe 20. The input interface 109 may receive a user input for controlling the probe 20. For example, the user input may include, but is not limited to, inputs for manipulating buttons, keypads, mice, trackballs, jog switches, or knops, an input for touching a touchpad or a touch screen, a voice input, a motion input, and an input of biometric information (e.g., iris recognition, fingerprint recognition, etc.).

The display 112 may display ultrasound images generated by the probe 20, ultrasound images generated by processing ultrasound data generated by the probe 20, ultrasound images received from the ultrasound imaging apparatus 40, various pieces of information processed by the ultrasound imaging system 100, or the like. In addition, the display 112 may further display status information of the probe 20. The status information of the probe 20 may include at least one of device information of the probe 20, battery status information of the probe 20, frequency band information of the probe 20, output information of the probe 20, information about failures of the probe 20, setting information of the probe 20, or temperature information of the probe 20.

The probe 20 may include one or a plurality of displays 112 depending on its implemented configuration. Furthermore, the display 112 may include a touch panel or a touch screen. The display 112 may also include a flexible display.

The communication module 119 may wirelessly transmit the generated ultrasound data or ultrasound image to the ultrasound imaging apparatus 40 via a wireless network. The communication module 119 may also receive a control signal and data from the ultrasound imaging apparatus 40.

The ultrasound imaging apparatus 40 may receive ultrasound data or an ultrasound image from the probe 20.

In an embodiment, when the probe 20 includes the image processor 130 capable of generating an ultrasound image by using ultrasound data, the probe 20 may transmit ultrasound data or an ultrasound image generated by the image processor 130 to the ultrasound imaging apparatus 40.

In an embodiment, when the probe 20 does not include the image processor 130 capable of generating an ultrasound image by using ultrasound data, the probe 20 may transmit ultrasound data to the ultrasound imaging apparatus 40. Ultrasound data may include ultrasound raw data, and an ultrasound image may mean ultrasound image data.

The ultrasound imaging apparatus 40 may include a processor 120, an image processor 130, a display 140, a memory 150, a communication module 160, and an input interface 170.

The image processor 130 generates or processes an ultrasound image by using ultrasound data received from the probe 20.

The display 140 may display an ultrasound image received from the probe 20, an ultrasound image generated by processing ultrasound data received from the probe 20, various pieces of information processed by the ultrasound imaging system 100, or the like. The ultrasound imaging apparatus 40 may include one or a plurality of displays 140 depending on its implemented configuration. Furthermore, the display 140 may include a touch panel or a touch screen. In addition, the display 140 may include a flexible display.

The processor 120 may control all operations of the ultrasound imaging apparatus 40 and operations of components of the ultrasound imaging apparatus 40. The processor 120 may execute programs or applications stored in the memory 150 to perform or control various operations or functions of the ultrasound imaging apparatus 40. The processor 120 may also receive a control signal from the input interface 170 or an external device to control an operation of the ultrasound imaging apparatus 40.

The ultrasound imaging apparatus 40 includes the communication module 160 via which it may be connected to and communicate with external devices (e.g., servers, medical devices, and portable devices such as smartphones, tablet PCs, wearable devices, etc.).

The communication module 160 may include at least one component that enables communication with an external device. The communication module 160 may include, for example, at least one of a short-range communication module, a wired communication module, or a wireless communication module.

The communication module 160 of the ultrasound imaging apparatus 40 may communicate with the communication module 119 of the probe 20 by using a network or a short-range wireless communication method. For example, the communication module 160 of the ultrasound imaging apparatus 40 may communicate with the communication module 119 of the probe 20 by using any one of wireless data communication methods including a wireless local area network (WLAN), Wi-Fi, Bluetooth, ZigBee, Wi-Fi Direct (WFD), Infrared Data Association (IrDA), Bluetooth Low Energy (BLE), near field communication (NFC), wireless broadband Internet (WiBro), World Interoperability for Microwave Access (WiMAX), Shared Wireless Access Protocol (SWAP), Wireless Gigabit Alliance (WiGig), radio frequency (RF) communication, 60 gigahertz (GHz) millimeter wave (mmWave) short-range communication, etc.

To achieve this, the communication module 160 of the ultrasound imaging apparatus 40 and the communication module 119 of the probe 20 may each include at least one of a WLAN communication module, a Wi-Fi communication module, a Bluetooth communication module, a ZigBee communication module, a WFD communication module, an IrDA communication module, a BLE communication module, an NFC communication module, a WiBro) communication module, a WiMAX communication module, a SWAP communication module, a WiGig communication module, an RF communication module, or 60 GHz mmWave short-range communication module.

In an embodiment, the probe 20 may transmit device information (e.g., identification (ID) information) of the probe 20 to the ultrasound imaging apparatus 40 by using a first communication method (e.g., BLE), and may be paired wirelessly with the ultrasound imaging apparatus 40. Furthermore, the probe 20 may transmit ultrasound data and/or ultrasound images to the paired ultrasound imaging apparatus 40.

The device information of the probe 20 may include various pieces of information related to a serial number, a model name, a battery status, etc. of the probe 20.

The ultrasound imaging apparatus 40 may receive, from the probe 20, the device information (e.g., ID information) of the probe 20 by using the first communication method (e.g., BLE), and may be paired wirelessly with the probe 20. Furthermore, the ultrasound imaging apparatus 40 may transmit an activation signal to the paired probe 20 and receive ultrasound data and/or ultrasound images from the probe 20. In this case, the activation signal may include a signal for controlling an operation of the probe 20.

In an embodiment, the probe 20 may transmit the device information (e.g., ID information) of the probe 20 to the ultrasound imaging apparatus 40 by using the first communication method (e.g., BLE), and may be paired wirelessly with the ultrasound imaging apparatus 40. Furthermore, by using a second communication method (e.g., 60 GHz mmWave or Wi-Fi), the probe 20 may transmit ultrasound data and/or ultrasound images to the ultrasound imaging apparatus 40 paired through the first communication method.

The ultrasound imaging apparatus 40 may receive, from the probe 20, the device information (e.g., ID information) of the probe 20 by using the first communication method (e.g., BLE), and may be paired wirelessly with the probe 20. Furthermore, the ultrasound imaging apparatus 40 may transmit an activation signal to the paired probe 20 and receive ultrasound data and/or ultrasound images from the probe 20 by using the second communication method (e.g., 60 GHz mmWave or Wi-Fi).

According to an embodiment, the first communication method used to pair the probe 20 and the ultrasound imaging apparatus 40 with each other may have a lower frequency band than the second communication method used by the probe 20 to transmit ultrasound data and/or ultrasound images to the ultrasound imaging apparatus 40.

The display 140 of the ultrasound imaging apparatus 40 may display UIs indicating device information of the probe 20. For example, the display 140 may display UIs indicating ID information of the probe 20, a pairing method indicating a method of pairing the ultrasound imaging apparatus 40 with the probe 20, a status of data communication between the probe 20 and the ultrasound imaging apparatus 40, a method of performing data communication with the ultrasound imaging apparatus 40, a battery status of the probe 20, etc.

When the probe 20 includes the display 112, the display 112 of the probe 20 may display UIs indicating device information of the probe 20. For example, the display 112 may display UIs indicating ID information of the probe 20, a pairing method indicating a method of pairing the probe 20 with the ultrasound imaging apparatus 40, a status of data communication between the probe 20 and the ultrasound imaging apparatus 40, a method of performing data communication with the ultrasound imaging apparatus 40, a battery status of the probe 20, etc.

The communication module 160 may receive a control signal and data from an external device. The processor 120 may control an operation of the ultrasound imaging apparatus 40 in response to the control signal received via the communication module 160.

Furthermore, the processor 120 may transmit a control signal to an external device via the communication module 160 to control the external device in response to the transmitted control signal. The external device may operate in response to a control signal received from the ultrasound imaging apparatus 40, or process data received from the ultrasound imaging apparatus 40.

The external device may receive or download the program or application related to the ultrasound imaging apparatus 40 from the ultrasound imaging apparatus 40, the probe 20, or a server, and install and execute the program or application thereon. The ultrasound imaging apparatus 40, the probe 20, or the server providing a program or application may include a recording medium storing instructions, commands, installation files, executable files, or related data of the program or application. The external device may also be sold with programs or applications installed.

The memory 150 may store various types of data or programs for driving and controlling the ultrasound imaging apparatus 40, input and/or output ultrasound data, ultrasound images, etc.

Examples of the ultrasound imaging system 100 according to an embodiment are described with reference to FIGS. 2A, 2B, 2C, and 2D.

FIGS. 2A, 2B, 2C, and 2D illustrate ultrasound imaging apparatuses according to an embodiment.

Figure 2A:
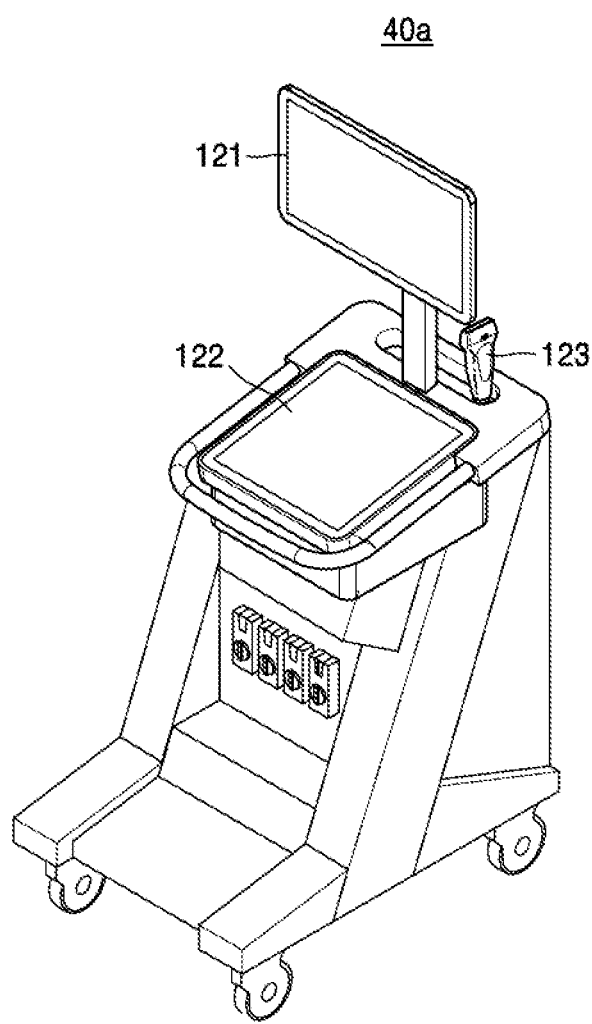
FIGS. 2A, 2B, 2C, and 2D are diagrams illustrating examples of an ultrasound imaging system according to an embodiment.
Figure 2B:
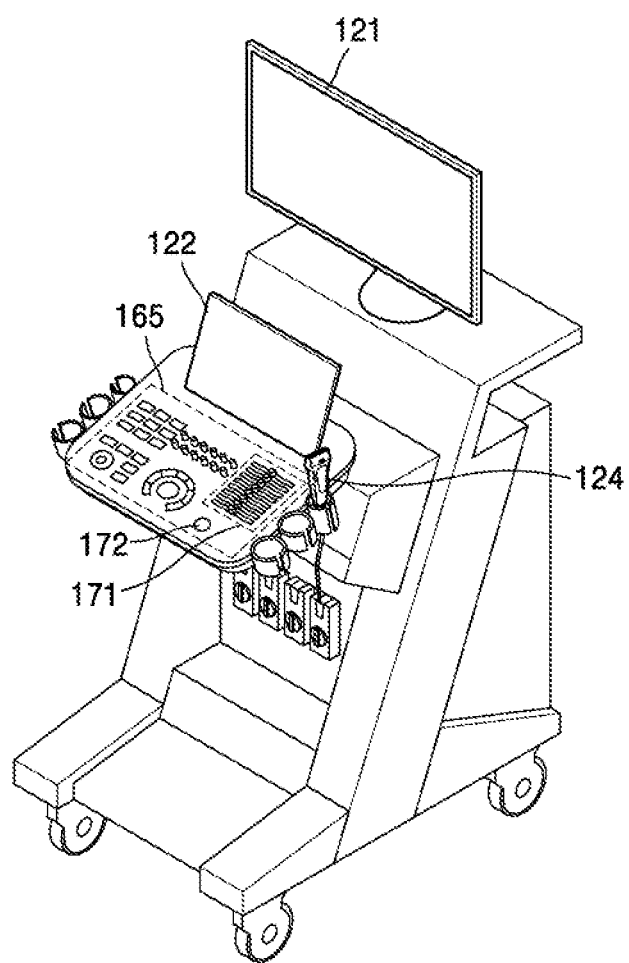

Referring to FIGS. 2A and 2B, ultrasound imaging apparatuses 40a and 40b may each include a main display 121 and a sub-display 122. The main display 121 and the sub-display 122 may correspond to the display 140 of FIGS. 1A and 1B. At least one of the main display 121 or the sub-display 122 may be implemented as a touch screen. At least one of the main display 121 or the sub-display 122 may display ultrasound images or various pieces of information processed by each of the ultrasound imaging apparatuses 40a and 40b. Furthermore, at least one of the main display 121 or the sub-display 122 may be implemented as a touch screen, and provide a graphical user interface (GUI), thereby receiving, from a user, data for controlling each of the ultrasound imaging apparatuses 40a and 40b. For example, the main display 121 may display an ultrasound image, and the sub-display 122 may display a control panel for controlling display of the ultrasound image in the form of a GUI. The sub-display 122 may receive data for controlling the display of an image through the control panel displayed in the form of the GUI. For example, a time gain compensation (TGC) button, a lateral gain compensation (LGC) button, a freeze button, a trackball, a jog switch, or a knop may be provided as a GUI on the sub-display 122.

Each of the ultrasound imaging apparatuses 40a and 40b may control the display of the ultrasound image on the main display 121 by using the input control data. Furthermore, the ultrasound imaging apparatus 40a or 40b may be connected to the probe 20 by wire or wirelessly to transmit and receive ultrasound signals to and from an object.

Referring to FIG. 2B, the ultrasound imaging apparatus 40b may further include a control panel 165 in addition to the main display 121 and the sub-display 122. The control panel 165 may include buttons, trackballs, jog switches, knops, etc., and receive data for controlling the ultrasound imaging apparatus 40b from the user. For example, the control panel 165 may include a time gain compensation (TGC) button 171 and a freeze button 172. The TGC button 171 is for setting a TGC value for each depth of an ultrasound image. Also, when an input of the freeze button 172 is detected during scanning of an ultrasound image, the ultrasound imaging apparatus 40b may maintain a state in which a frame image at a corresponding time point is displayed, capture the frame image at the time point, or store the frame image at the time point.

Moreover, the buttons, trackballs, jog switches, knops, etc. included in the control panel 165 may be provided as a GUI on the main display 121 or the sub-display 122. Furthermore, the ultrasound imaging apparatus 40a or 40b may be connected to the probe 20 to transmit and receive ultrasound signals to and from the object.

Furthermore, the ultrasound imaging apparatus 40a or 40b may include various types of input/output (I/O) interfaces such as speakers, light-emitting diodes (LEDs), and vibration devices. For example, the ultrasound imaging apparatus 40a or 40b may output various pieces of information in the form of graphics, sound, or vibrations via the I/O interfaces. In addition, the ultrasound imaging apparatus 40a or 40b may output various notifications or data via the I/O interfaces.

Figure 2C:
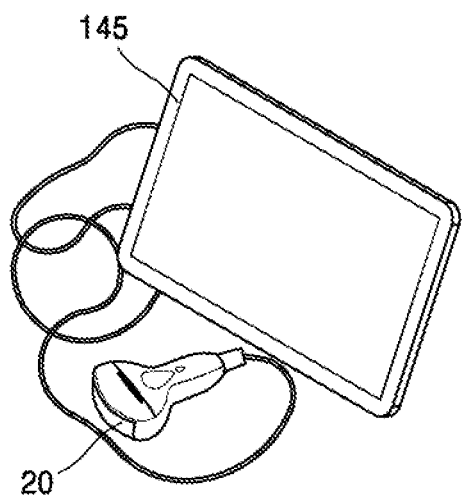
Figure 2D:
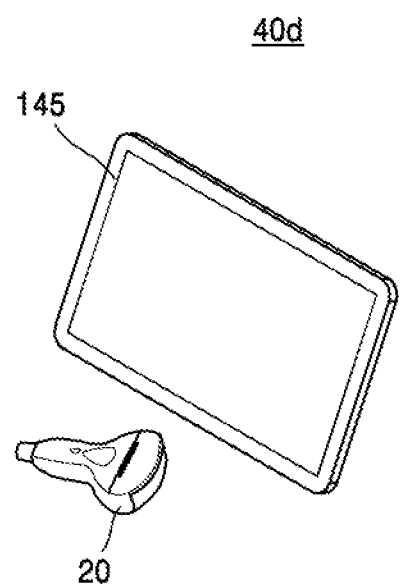

Referring to FIGS. 2C and 2D, ultrasound imaging apparatuses 40c and 40d may also be implemented as portable ultrasound imaging apparatuses. Examples of the ultrasound imaging apparatus 40c or 40d that is portable may include, but are not limited to, a smartphone, a laptop computer, a PDA, a tablet PC, etc., each of which includes a probe and an application.

The ultrasound imaging apparatus 40c may include a main body 145. Referring to FIG. 2C, the probe 20 may be connected to one side of the main body 145 by wire. To this end, the main body 145 may include a connection terminal to or from which a cable connected to the probe 20 may be attached or detached. The probe 20 may include a cable including a connection terminal connectable to the main body 145.

Referring to FIG. 2D, the probe 20 may be wirelessly connected to the ultrasound imaging apparatus 40d. The main body 145 may include an I/O interface (e.g., a touch screen). The I/O interface may display an ultrasound image, various pieces of information processed by the ultrasound imaging apparatus 40d, a GUI, etc.

The ultrasound imaging apparatus 40d and the probe 20 may establish communication or be paired with each other by using short-range wireless communication. For example, the ultrasound imaging apparatus 40d may communicate with the probe 20 by using Bluetooth, BLE, Wi-Fi, WFD, or the like.

The ultrasound imaging apparatus 40c or 40d may execute a program or application related to the probe 20 to control the probe 20 and output information related to the probe 20. The ultrasound imaging apparatus 40c or 40d may perform operations related to the probe 20 while communicating with a certain server. The probe 20 may be registered with the ultrasound imaging apparatus 40c or 40d, or the server. The ultrasound imaging apparatus 40c or 40d may communicate with the registered probe 20 and perform operations related to the probe 20.

Furthermore, the ultrasound imaging apparatus 40c or 40d may include various types of I/O interfaces such as speakers, LEDs, and vibration devices. For example, the ultrasound imaging apparatus 40c or 40d may output various pieces of information in the form of graphics, sound, or vibrations via the I/O interfaces. In addition, the ultrasound imaging apparatus 40c or 40d may output various notifications or data via the I/O interfaces.

According to an embodiment, the ultrasound imaging apparatus 40a, 40b, 40c, or 40d may process ultrasound images or obtain additional information from the ultrasound images by using an artificial intelligence (AI) model. According to an embodiment, the ultrasound imaging apparatus 40a, 40b, 40c, or 40d may use an AI model to generate ultrasound images or perform processing, such as correction, image enhancement, encoding, or decoding, on the ultrasound images. Furthermore, according to an embodiment, the ultrasound imaging apparatus 40a, 40b, 40c, or 40d may use an AI model to perform processing, such as defining a baseline, obtaining anatomical information, obtaining lesion information, extracting surfaces, defining a boundary, measuring a length, measuring an area, measuring a volume, or generating annotations from an ultrasound image.

An AI model may be provided in the ultrasound imaging apparatus 40a, 40b, 40c, or 40d, or may be provided in a server.

AI models may be implemented using various artificial neural network models or deep neural network (DNN) models. Furthermore, the AI models may be trained and generated using various machine learning algorithms or deep learning algorithms. The AI models may be implemented using models such as convolutional neural networks (CNNs), recurrent neural networks (RNNs), generative adversarial networks (GANs), long short-term memory (LSTM), etc.

As described below with reference to FIG. 3, the probe 20 according to the disclosure may obtain an ultrasound image of an object by wirelessly generating ultrasound signals. It is assumed herein that the probe 20 according to the disclosure is a wireless ultrasound probe. Furthermore, the wireless ultrasound probe according to the disclosure is referred to as the probe 20.

Figure 3:
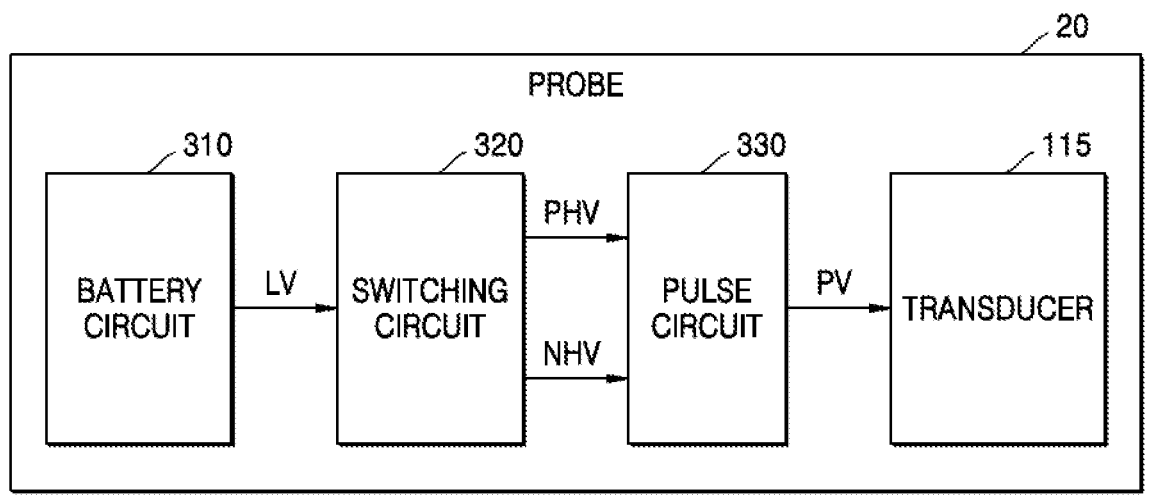
FIG. 3 is a block diagram illustrating a probe according to an embodiment.

FIG. 3 is a block diagram illustrating the probe 20 according to an embodiment. According to an embodiment, the probe 20 may include a battery circuit 310, a switching circuit 320, a pulse circuit 330, and a transducer 115.

The battery circuit 310 may generate power for driving the probe 20 and transmit the power to other components. The battery circuit 310 may include a battery, a battery management module (BMS), and a charging terminal. The battery circuit 310 may generate a low voltage LV. The battery circuit 310 may transmit the low voltage LV to the switching circuit 320.

The switching circuit 320 may receive the low voltage LV from the battery circuit 310. The switching circuit 320 may convert the low voltage LV into a positive high voltage PHV and a negative high voltage NHV. The switching circuit 320 may transmit the positive high voltage PHV and the negative high voltage NHV to the pulse circuit 330.

The pulse circuit 330 may receive the positive high voltage PHV and the negative high voltage NHV from the switching circuit 320. The pulse circuit 330 may output a transmission signal by using the positive high voltage PHV and the negative high voltage NHV. The transmission signal may include a pulse voltage PV. The pulse circuit 330 may output the transmission signal including the pulse voltage PV to the transducer 115.

The transducer 115 may receive the transmission signal from the pulse circuit 330. The transducer 115 may transmit an ultrasound signal to the object by using the transmission signal.

Figure 4:
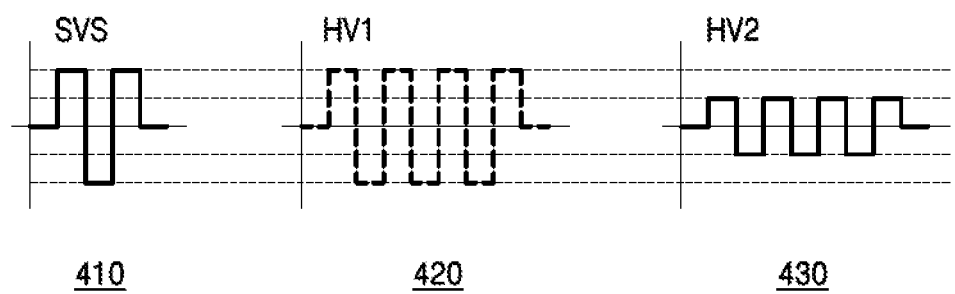
FIG. 4 is a pulse waveform diagram of a transmission signal from a probe, according to an embodiment.

FIG. 4 is a pulse waveform diagram of a transmission signal from the probe 20 according to an embodiment.

A first graph 410 is a pulse waveform diagram of a transmission signal output by the probe 20 having a specified sample volume size (or SVS).

A second graph 420 is a pulse waveform diagram of a transmission signal that the probe 20 is able to output when the sample volume size increases. When the sample volume size increases, the number of bursts in a waveform may increase to maintain a strength of the transmission signal. An amplitude of a burst in the waveform may be a first high voltage HV1.

A third graph 430 is a pulse waveform diagram of a transmission signal actually output by the probe 20 when the sample volume size increases. The transmission signal from the probe 20 may be limited by acoustic power and intensity. When the number of bursts in the waveform increases with an increase in the sample volume size, a magnitude of the transmission signal from the probe 20 may be reduced due to limitations in the acoustic power and intensity. To reduce the magnitude of the transmission signal from the probe 20, an amplitude of the bursts in the waveform may be reduced to a second high voltage HV2.

Figure 5:
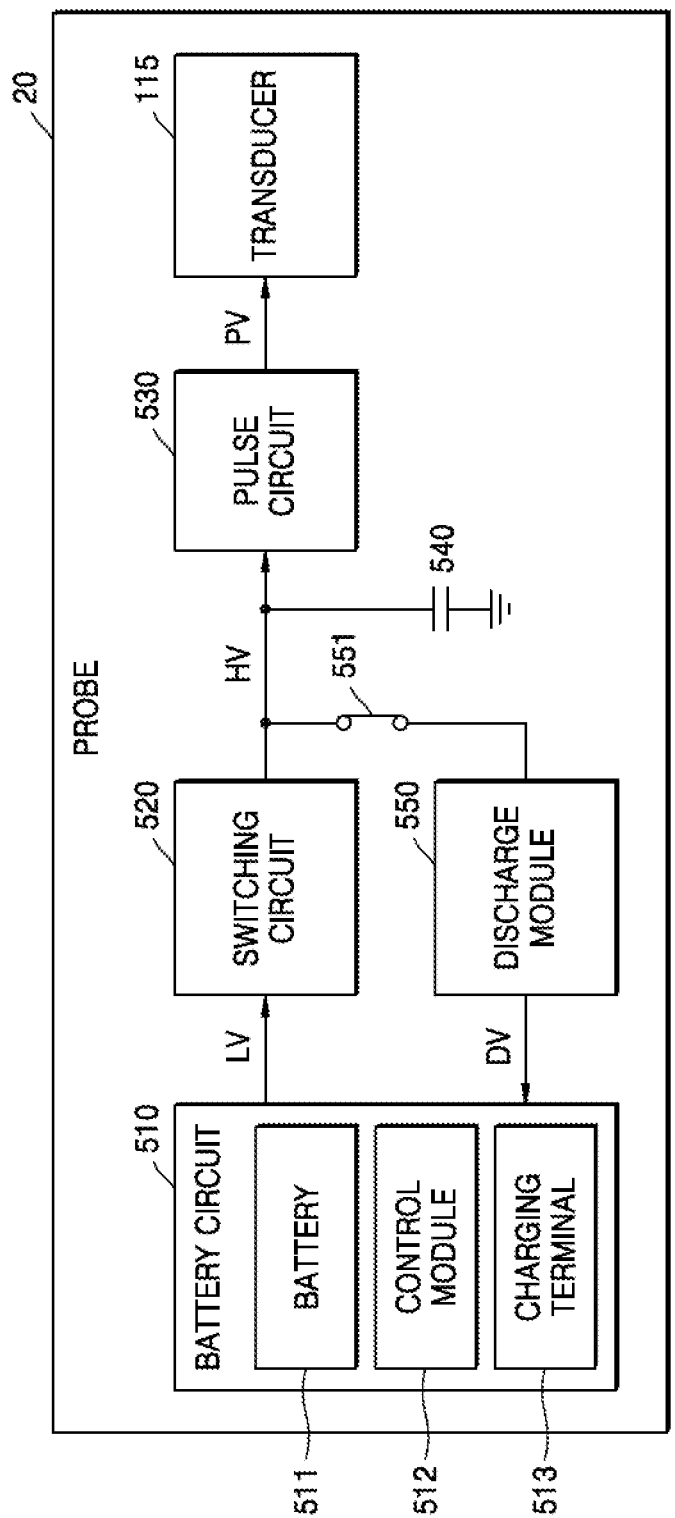
FIG. 5 is a block diagram illustrating a probe according to an embodiment.

FIG. 5 is a block diagram illustrating the probe 20 according to an embodiment. According to an embodiment, the probe 20 may include a battery circuit 510, a switching circuit 520, a pulse circuit 530, a transducer 115, a capacitor 540, and a discharge module 550.

The battery circuit 510 may generate power for driving the probe 20 and transmit the power to other components. The battery circuit 510 may include a battery 511, a control module 512, and a charging terminal 513. The control module 512 may include a BMS. The battery circuit 510 may generate a low voltage LV. The battery circuit 510 may store the low voltage LV in the switching circuit 520.

The switching circuit 520 may receive the low voltage LV from the battery circuit 510. The switching circuit 520 may convert the low voltage LV into a high voltage HV. The switching circuit 520 may include a switch circuit and a regulator for increasing a magnitude of the input voltage to be output. The switching circuit 520 may transmit the high voltage HV to the pulse circuit 530. The switching circuit 520 may also transmit the high voltage HV to the capacitor 540.

The pulse circuit 530 may receive the high voltage LV from the switching circuit 520. The pulse circuit 530 may receive the high voltage HV stored in the capacitor 540. The pulse circuit 530 may output a transmission signal by using the high voltage HV. The transmission signal may include a pulse voltage PV. The pulse circuit 530 may output the transmission signal including the pulse voltage PV to the transducer 115.

The transducer 115 may receive the transmission signal from the pulse circuit 530. The transducer 115 may transmit an ultrasound signal to the object by using the transmission signal.

The capacitor 540 may be electrically connected to the pulse circuit 530. One side of the capacitor 540 may be connected to a wire connecting the switching circuit 520 to the pulse circuit 530. The other side of the capacitor 540 may be connected to ground. The capacitor 540 may receive the high voltage HV from the switching circuit 520. The capacitor 540 may store the high voltage HV received from the switching circuit 520. The capacitor 540 may transmit the stored high voltage HV to the pulse circuit 530.

The discharge module 550 may be electrically connected to the capacitor 540. The discharge module 550 may be connected to the wire that connects the switching circuit 520 to the pulse circuit 530 and is connected to the one side of the capacitor 540. The discharge module 550 may discharge the high voltage HV stored in the capacitor 540. The discharge module 550 may include a discharge circuit for discharging the high voltage HV stored in the capacitor 540.

The discharge module 550 may detect whether a first event occurs. The first event may be an event in which damage to the probe 20 occurs due to a high voltage HV stored in the capacitor 540. When a high voltage HV is stored in the capacitor 540 upon the occurrence of the first event, damage to the probe 20 may occur. For example, the first event may include at least one of a change in a bias voltage related to a magnitude of the transmission signal, a fall of the probe 20, or water leakage in the probe 20.

In response to detecting the first event, the discharge module 550 may start a discharge operation for discharging the high voltage HV stored in the capacitor 540. The discharge module 550 may start the discharge operation to quickly discharge the high voltage HV stored in the capacitor 540. Accordingly, even when the first event occurs, the discharge module 550 may reduce the damage to the probe 20 due to the high voltage HV stored in the capacitor 540.

A switch 551 may be provided between the capacitor 540 and the discharge module 550. In response to detecting the first event, the discharge module 550 may transmit a closing control signal to the switch 551. The discharge module 550 may discharge the high voltage HV stored in the capacitor 540.

The discharge module 550 may transmit the high voltage HV stored in the capacitor 540 to the battery circuit 510. The discharge module 550 may receive the high voltage HV stored in the capacitor 540. The discharge module 550 may generate a delivery voltage DV by using the received high voltage HV. The discharge module 550 may transmit the delivery voltage DV to the battery circuit 510. The discharge module 550 may transmit the delivery voltage DV to the battery circuit 510 via the charging terminal 513. Accordingly, the discharge module 550 may recycle the high voltage HV stored in the capacitor 540.

In response to detecting the first event, the discharge module 550 may transmit, to the pulse circuit 530, a dummy control signal that causes the pulse circuit 530 to output a dummy signal. In response to receiving the dummy control signal, the pulse circuit 530 may transmit a dummy signal to allow the discharge module 550 to discharge the high voltage HV stored in the capacitor 540. As the pulse circuit 530 transmits the dummy signal under the control of the discharge module 550, the high voltage HV stored in the capacitor 540 may be discharged more quickly in response to the detection of the first event.

Figure 6:
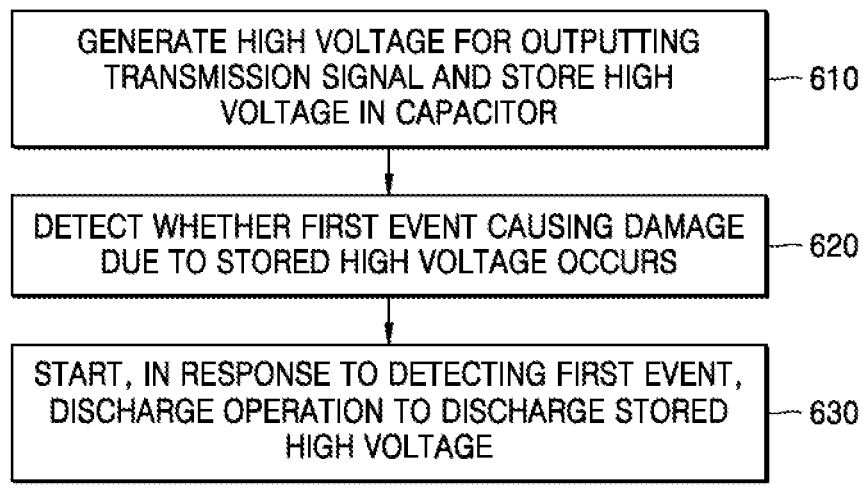
FIG. 6 is a flowchart of a control method of a probe, according to an embodiment.

FIG. 6 is a flowchart of a control method of the probe 20, according to an embodiment.

According to an embodiment, in operation 610, the probe 20 may generate a high voltage HV for outputting a transmission signal and store the high voltage HV in the capacitor 540. The transmission signal may include a pulse voltage PV. The probe 20 may output a transmission signal including a pulse voltage PV to the transducer 115 so that the transducer 115 may transmit an ultrasound signal to the object by using the transmission signal.

According to an embodiment, in operation 620, the probe 20 may detect whether a first event occurs that causes damage to the probe 20 due to the stored high voltage HV. When the high voltage HV is stored in the capacitor 540 upon the occurrence of the first event, damage to the probe 20 may occur. For example, the first event may include at least one of a change in a bias voltage related to a magnitude of the transmission signal, a fall of the probe 20, or water leakage in the probe 20.

According to an embodiment, in operation 630, in response to detecting the first event, the probe 20 may start a discharge operation for discharging the stored high voltage HV. When the probe 20 starts the discharge operation, the discharge module 550 may transmit a closing control signal to the switch 551 in response to detecting the first event. When the switch 551 is closed, the discharge module 550 may discharge the high voltage HV stored in the capacitor 540.

When discharging the high voltage HV stored in the capacitor 540, the discharge module 550 may transmit the high voltage HV stored in the capacitor 540 to the battery circuit 510.

When the probe 20 starts the discharge operation, in response to detecting the first event, the discharge module 550 may transmit, to the pulse circuit 530, a dummy control signal that causes the pulse circuit 530 to output a dummy signal. In response to receiving the dummy control signal, the pulse circuit 530 may transmit a dummy signal to allow the discharge module 550 to discharge the high voltage HV stored in the capacitor 540.

Figure 7:
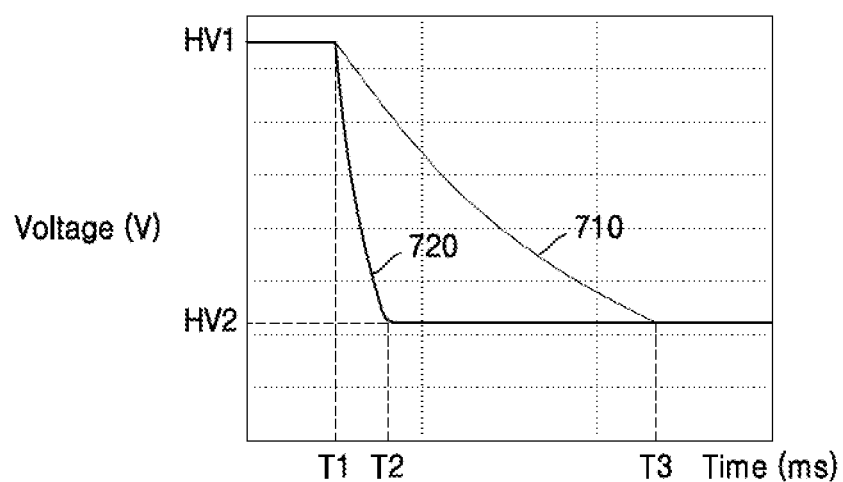
FIG. 7 is a discharge waveform diagram of a probe according to an embodiment.

FIG. 7 is a discharge waveform diagram of the probe 20 according to an embodiment.

A first high voltage HV1 may be stored in the capacitor 540 of the probe 20. The probe 20 may start a discharge operation at a first time T1.

When the probe 20 does not have the discharge module 550, the first high voltage HV1 stored in the capacitor 540 of the probe 20 may be discharged to a second high voltage HV2 at a third time T3, as shown in a first graph 710.

When the probe 20 has the discharge module 550, the first high voltage HV1 stored in the capacitor 540 of the probe 20 may be discharged to the second high voltage HV2 at a second time T3, as shown in a second graph 720. The discharge module 550 may more quickly discharge the high voltage stored in the capacitor 540 of the probe 20, thereby reducing the probability that the high voltage stored in the capacitor will cause damage to the probe 20 stored in the capacitor 540 even when the first event occurs.

Figure 8:
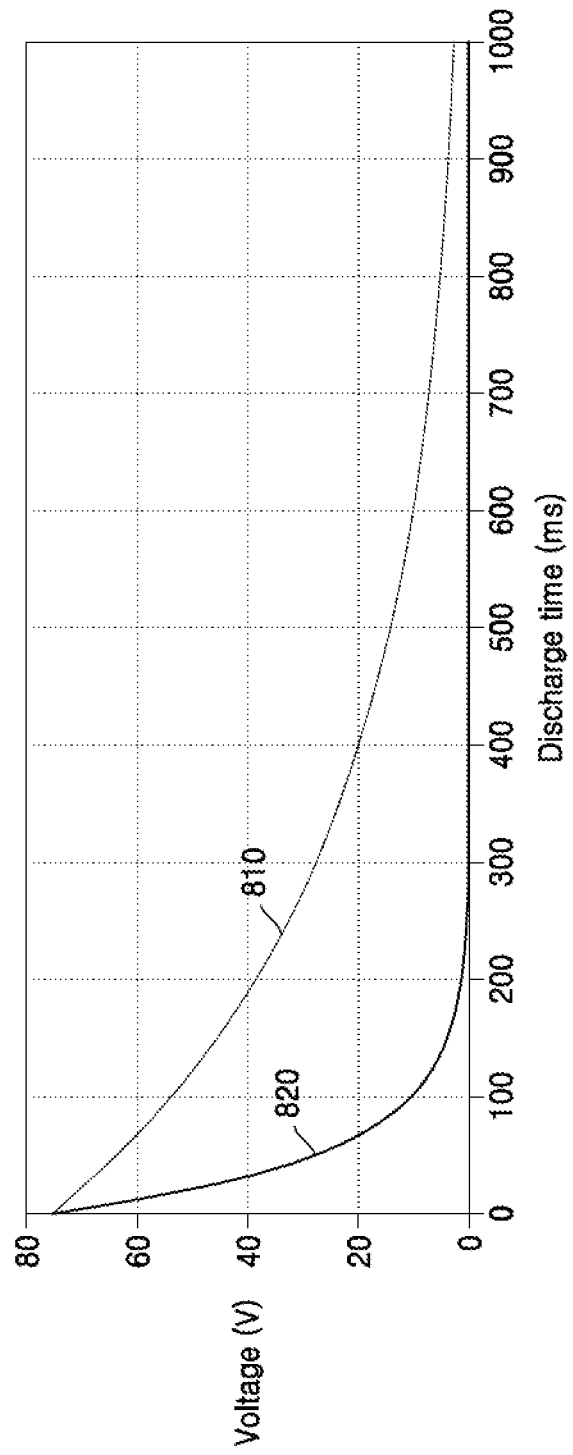
FIG. 8 is a discharge waveform diagram of a probe according to an embodiment.

FIG. 8 is a discharge waveform diagram of the probe 20 according to an embodiment.

A high voltage having a magnitude of about 80 volts (V) may be stored in the capacitor 540 of the probe 20. The probe 20 may start a discharge operation at a discharge time of 0.

When the probe 20 does not have the discharge module 550, as seen in a first graph 810, the high voltage stored in the capacitor 540 of the probe 20 may be discharged when a time of about 1000 ms has elapsed after the start of the discharge operation.

When the probe 20 has the discharge module 550, as seen in a second graph 820, the high voltage stored in the capacitor 540 of the probe 20 may be discharged when a time of at least 200 ms but not more than 300 ms has elapsed after the start of the discharge operation. The discharge module 550 may more quickly discharge the high voltage stored in the capacitor 540 of the probe 20, thereby reducing the probability that the high voltage stored in the capacitor will cause damage to the probe 20 stored in the capacitor 540 even when the first event occurs.

Figure 9:
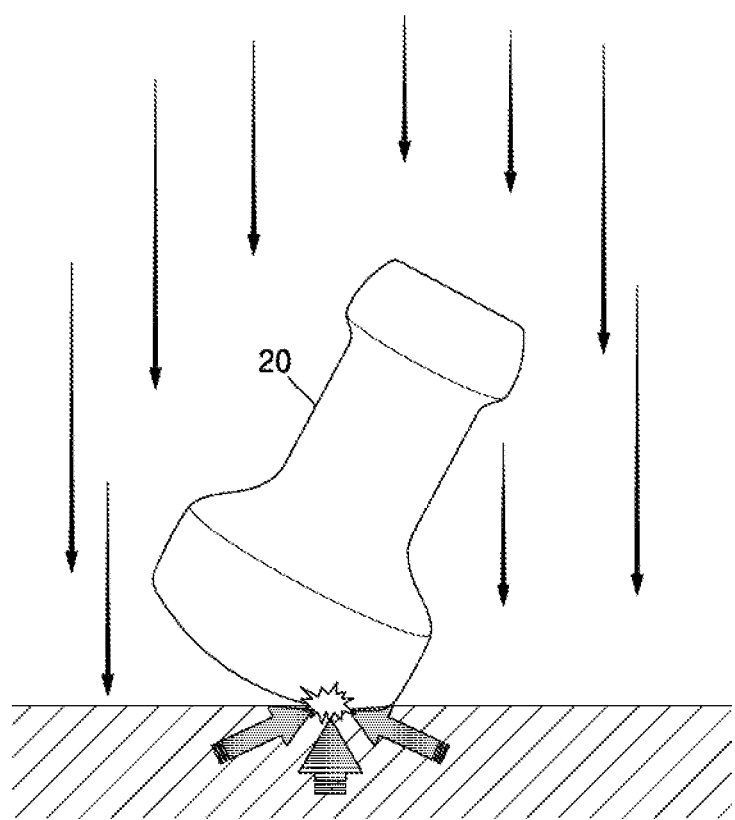
FIG. 9 is a diagram illustrating a falling event of a probe according to an embodiment.

FIG. 9 is a diagram illustrating a falling event of the probe 20 according to an embodiment.

The first event in which damage due to a stored high voltage occurs may include a fall of the probe 20. When a collision occurs due to a fall of the probe 20, a high voltage stored in the capacitor 540 may cause damage to the probe 20. For example, when a collision occurs due to a fall of the probe 20, the high voltage stored in the capacitor 540 may damage the switching circuit 520 or the pulse circuit 530. For example, when a collision occurs due to a fall of the probe 20, the high voltage stored in the capacitor 540 may be applied to other components of the probe 20 and damage the probe 20. When the high voltage stored in the capacitor 540 is discharged before the collision due to the fall of the probe 20, damage to the probe 20 may be reduced even when the collision occurs.

Figure 10:
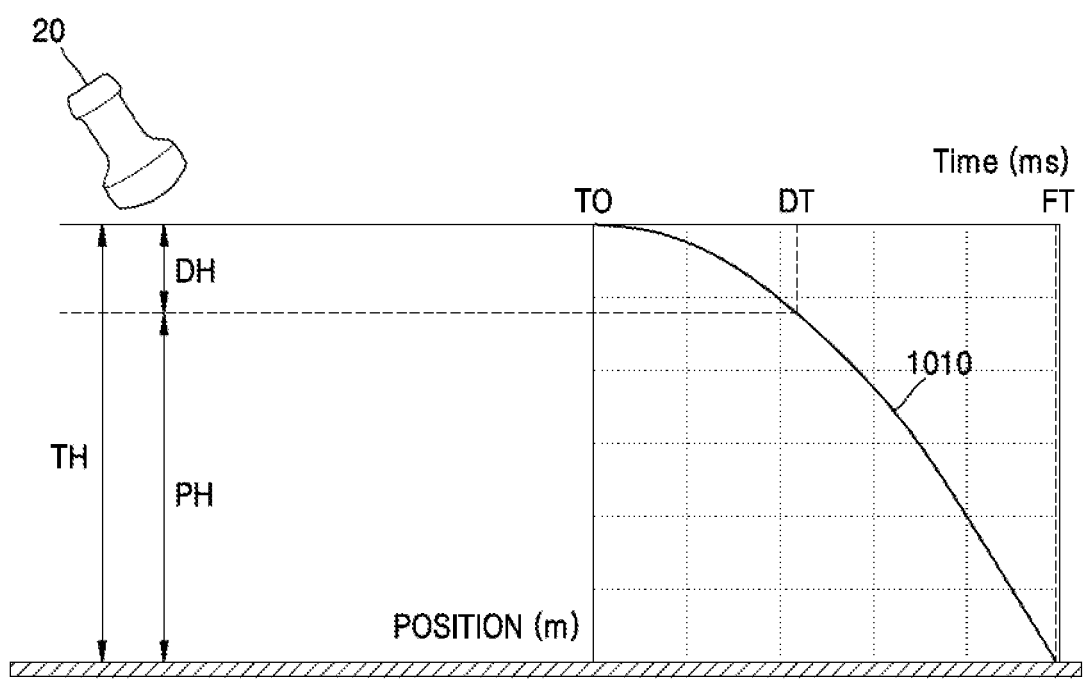
FIG. 10 is a diagram illustrating a position and an operation of a probe over time when the probe falls, according to an embodiment.

FIG. 10 is a diagram illustrating a position and an operation of the probe 20 over time when the probe 20 falls, according to an embodiment. The probe 20 may fall over time in a form like that shown in a first graph 1010. The probe 20 may fall by as much as a total fall height TH. The probe 20 may begin to fall at an initial time T0 and collide at a collision time FT.

The probe 20 may detect the fall of the probe 20. The probe 20 may include a sensor for measuring at least one of a position of the probe 20, a velocity of the probe 20, or an acceleration of the probe 20. For example, the probe 20 may include at least one of a gyro sensor, an acceleration sensor, or a 9-axis sensor.

The receiver module 117 of the probe 20 may generate ultrasound data based on reception signals that the transducer 115 receives from the object. The probe 20 may obtain position information of the probe 20. The probe 20 may detect whether the probe 20 is falling based on the position information and the ultrasound data. The probe 20 may analyze ultrasound echo signals and ultrasound image data included in the ultrasound data. The probe 20 may more quickly and accurately detect whether the probe 20 is falling based on an analysis result.

After the probe 20 falls at the initial time T0, the probe 20 may detect that the probe 20 is falling at a detection time DT. The probe 20 may detect that it is falling as it falls by as much as a detection height DH during the detection time DT. The probe 20 may start, at the detection time DT, a discharge operation for discharging a high voltage stored in the capacitor 540.

The probe 20 may fall by as much as a preparation height PH to prevent damage to the probe 20 during a period from the detection time DT to the collision time FT. The probe 20 may perform the discharge operation from the detection time DT to the collision time FT. The probe 20 may discharge the high voltage stored in the capacitor 540 by using the discharge module 550 from the detection time DT to the collision time FT. Accordingly, even when the probe 20 collides at the collision time FT, damage to the probe 20 due to the high voltage stored in the capacitor 540 may be reduced.

Figure 11:
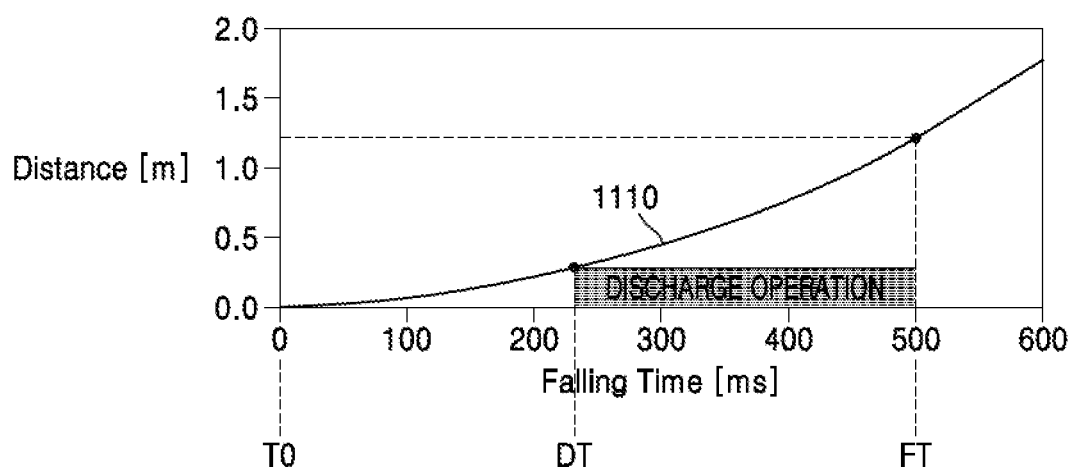
FIG. 11 is a diagram illustrating a position and an operation of a probe over time when the probe falls, according to an embodiment.

FIG. 11 is a diagram illustrating a position and an operation of the probe 20 over time when the probe 20 falls, according to an embodiment. The probe 20 may fall over time in a form like that shown in a first graph 1110. The probe 20 may begin to fall at an initial time T0 and collide at a collision time FT. For example, when the probe 20 falls by 1.2 m, the probe 20 may fall for 500 ms before the collision.

The probe 20 may include a sensor module for obtaining position information of the probe 20. The sensor module may include a sensor for measuring at least one of a position of the probe 20, a velocity of the probe 20, or an acceleration of the probe 20. For example, the sensor module may include at least one of a gyro sensor, an acceleration sensor, or a 9-axis sensor.

The sensor module may obtain position information of the probe 20. The sensor module may analyze the obtained position information and ultrasound echo signals and ultrasound image data included in ultrasound data generated by the receiver module 117. The sensor module may more quickly and accurately detect whether the probe 20 is falling based on analysis results.

After the probe 20 falls at the initial time T0, the probe 20 may detect that the probe 20 is falling at a detection time DT. The probe 20 may start, at the detection time DT, a discharge operation for discharging a high voltage stored in the capacitor 540.

The probe 20 may perform the discharge operation from the detection time DT to the collision time FT. The probe 20 may discharge the high voltage stored in the capacitor 540 by using the discharge module 550 from the detection time DT to the collision time FT. Accordingly, even when the probe 20 collides at the collision time FT, damage to the probe 20 due to the high voltage stored in the capacitor 540 may be reduced.

Figure 12:
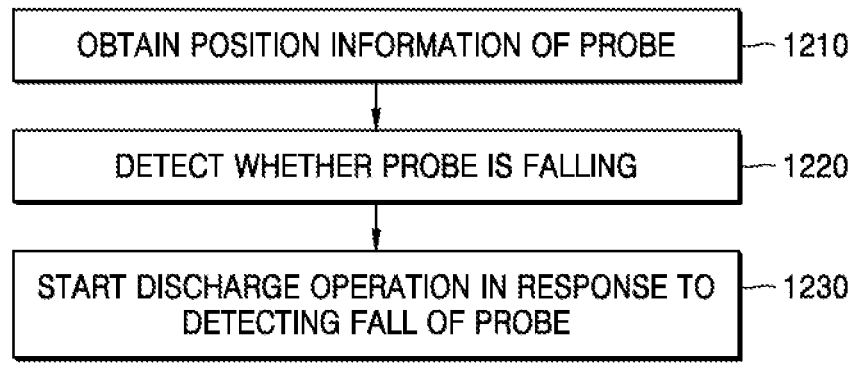
FIG. 12 is a flowchart illustrating a falling event of a probe, according to an embodiment.

FIG. 12 is a flowchart illustrating a falling event of the probe 20, according to an embodiment.

According to an embodiment, in operation 1210, the probe 20 may obtain position information of the probe 20. The probe 20 may obtain the position information of the probe 20 while detecting whether the first event has occurred.

According to an embodiment, in operation 1220, the probe 20 may detect whether the probe 20 is falling. The probe 20 may detect whether the probe 20 is falling by measuring at least one of a position of the probe 20, a velocity of the probe 20, or an acceleration of the probe 20. The probe 20 may detect whether the probe 20 is falling by analyzing ultrasound data obtained by the probe 20.

According to an embodiment, in operation 1230, the probe 20 may start a discharge operation in response to detecting whether the probe 20 is falling. When detecting that the probe 20 is falling, the probe 20 may discharge the high voltage stored in the capacitor 540 in preparation for a collision. Accordingly, even when the probe 20 collides, damage to the probe 20 due to the high voltage stored in the capacitor 540 may be reduced.

Figure 13:
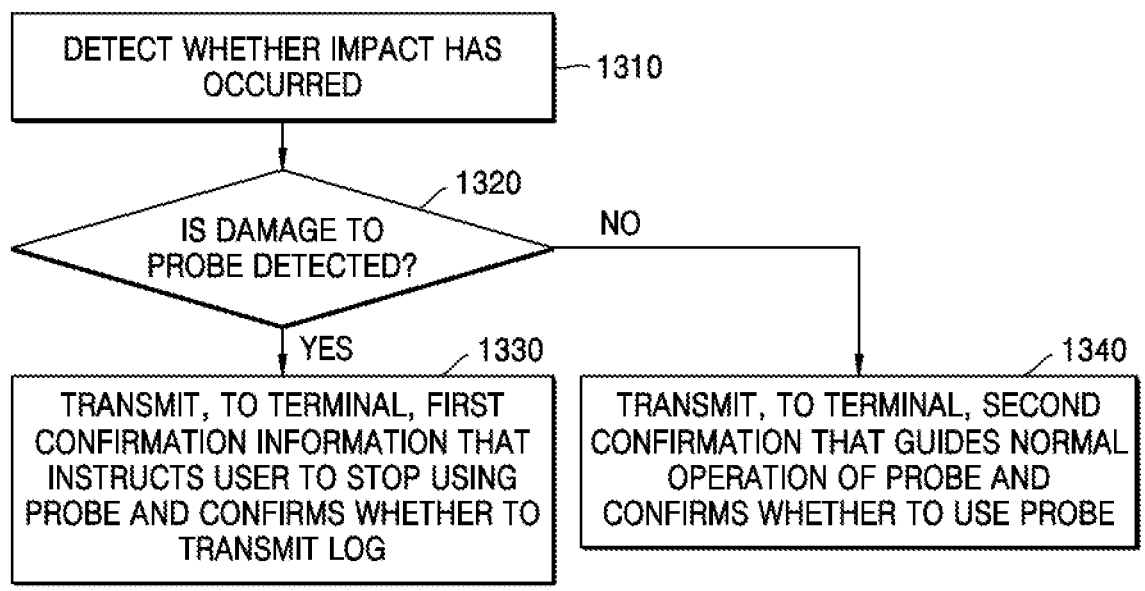
FIG. 13 is a flowchart of a procedure after a probe has fallen, according to an embodiment.

FIG. 13 is a flowchart of a procedure after the probe 20 has fallen, according to an embodiment.

According to an embodiment, in operation 1310, the probe 20 may detect whether an impact has occurred on the probe 20. A sensor module of the probe 20 may detect whether an impact has occurred on the probe 20. The sensor module may measure at least one of a position of the probe 20, a velocity of the probe 20, or an acceleration of the probe 20 while the probe 20 falls. The sensor module may detect whether an impact has occurred on the probe 20, based on at least one of the position of the probe 20, the velocity of the probe 20, or the acceleration of the probe 20 during the fall.

According to an embodiment, in operation 1320, the probe 20 may identify whether damage to the probe 20 has been detected. The discharge module 550 of the probe 20 may identify whether damage to the probe 20 has been detected. For example, the discharge module 550 may detect an abnormal voltage or current in at least one of the switching circuit 520, the pulse circuit 530, or the capacitor 540 of the probe 20. The discharge module 550 may identify whether the damage to the probe 20 has been detected based on a result of detecting the abnormal voltage or current. When the damage to the probe 20 has been detected (operation 1320—YES), the probe 20 may perform operation 1330. When the damage to the probe 20 has not been detected (operation 1320—NO), the probe 20 may perform operation 1340.

According to an embodiment, in operation 1330, the probe 20 may transmit, to a terminal, first confirmation information that instructs the user to stop using the probe 20 and confirms whether to transmit a log. The terminal may be an electronic device capable of communicating with the probe 20 and displaying information related to the probe 20.

The probe 20 may transmit, to the terminal, information that instructs the terminal to stop using the probe 20 because the probe 20 is damaged. The probe 20 may transmit, to the terminal, a control signal that causes the terminal to display a UI confirming whether to transmit a log related to the damage to the probe 20. When receiving the first confirmation information, the terminal may display a UI instructing the user to stop using the probe 20 and confirming whether to transmit a log related to the damage to the probe 20.

According to an embodiment, in operation 1340, the probe 20 may transmit, to the terminal, second confirmation that guides a normal operation of the probe 20 and confirms whether to use the probe 20. The probe 20 may transmit, to the terminal, information indicating that the probe 20 is not damaged and that the probe 20 is operating normally. The probe 20 may transmit, to the terminal, a control signal that causes the terminal to display a UI confirming whether to use the probe 20. When receiving the second confirmation information, the terminal may inform the user that the probe 20 is operating normally and display a UI confirming whether to use the probe 20.

Figure 14:
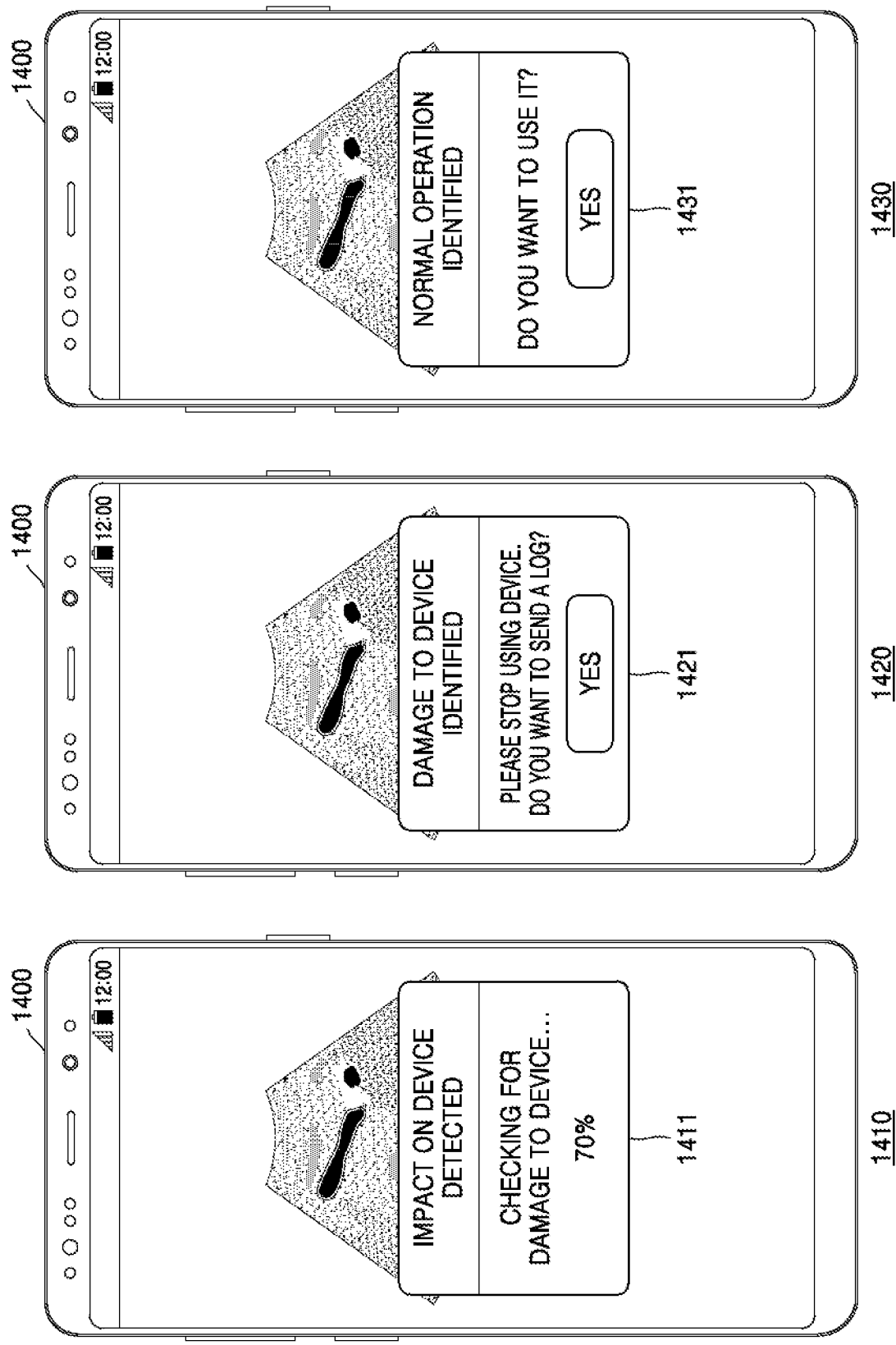
FIG. 14 is a diagram illustrating a user interface (UI) displayed after a probe has fallen, according to an embodiment.

FIG. 14 is a diagram illustrating a UI displayed after the probe 20 has fallen, according to an embodiment.

A terminal 1400 may display a first UI 1411 in a first situation 1410. The first situation 1410 may be a situation in which the probe 20 detects whether an impact has occurred on the probe 20 to identify whether the probe 20 is damaged. The probe 20 may transmit, to the terminal 1400, an impact notification signal indicating that the probe 20 is identifying whether the probe 20 is damaged. The terminal 1400 may receive the impact notification signal from the probe 20. The terminal 1400 may display the first UI 1411 in response to receiving the impact notification signal. The first UI 1411 may indicate that an impact on the probe 20 has been detected. The first UI 1411 may indicate that checking for damage to the probe 20 is being conducted. The first UI 1411 may display the progress of checking for the damage to the probe 20.

The terminal 1400 may display a second UI 1421 in a second situation 1410. The second situation 1420 may be a situation in which the damage to the probe 20 is detected. The probe 20 may transmit, to the terminal 1400, first confirmation information that instructs the user to stop using the probe 20 and confirms whether to transmit a log. The terminal 1400 may receive the first confirmation information from the probe 20. The terminal 1400 may display the second UI 1421 in response to receiving the first confirmation information. The second UI 1421 may indicate that the damage to the probe 20 has been identified. The second UI 1421 may display text instructing the user to stop using the probe 20. The second UI 1421 may display text confirming whether to transmit a log related to the damage to the probe 20.

The terminal 1400 may display a third UI 1431 in a third situation 1430. The third situation 1430 may be a situation in which the damage to the probe 20 is not detected. The probe 20 may transmit, to the terminal 1400, second confirmation information that guides a normal operation of the probe 20 and confirms whether to use the probe 20. The terminal 1400 may receive the second confirmation information from the probe 20. The terminal 1400 may display the third UI 1431 in response to receiving the second confirmation information. The third UI 1431 may display text indicating that the probe 20 is operating normally. The third UI 1431 may display text confirming whether to use the probe 20.

Figure 15:
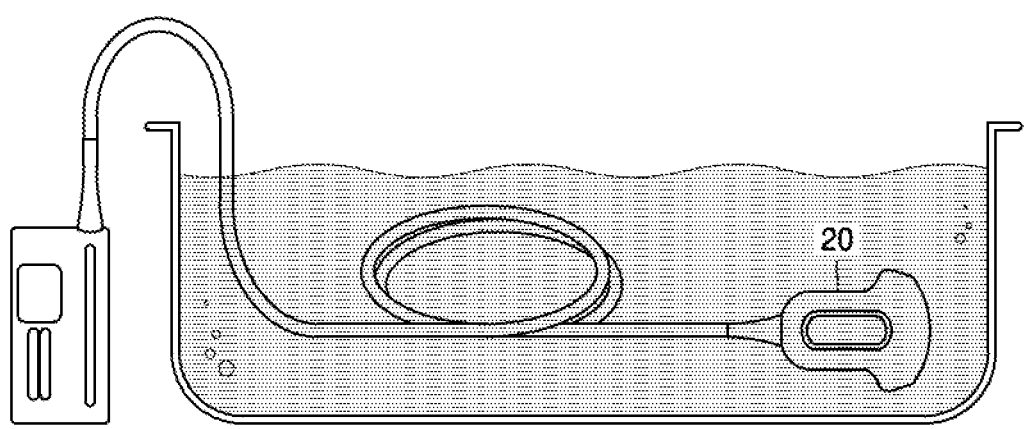
FIG. 15 is a diagram illustrating an example in which a water leakage event may occur to a probe, according to an embodiment.

FIG. 15 is a diagram illustrating an example in which a water leakage event may occur to the probe 20, according to an embodiment. For example, FIG. 15 is a diagram showing the probe 20 being immersed in a disinfectant solution to disinfect the probe 20 according to an embodiment.

The first event in which damage due to a stored high voltage occurs may include water leakage in the probe 20. When water leakage occurs in the probe 20, the probe 20 may be damaged due to a high voltage stored in the capacitor 540. For example, when water leakage occurs in the probe 20, the high voltage stored in the capacitor 540 may damage the switching circuit 520 or the pulse circuit 530. For example, when water leakage occurs in the probe 20, the high voltage stored in the capacitor 540 may be applied to other components of the probe 20 and damage the probe 20. When the high voltage stored in the capacitor 540 is discharged before water leakage in the probe 20, damage to the probe 20 may be reduced even when the water leakage occurs.

Figure 16:
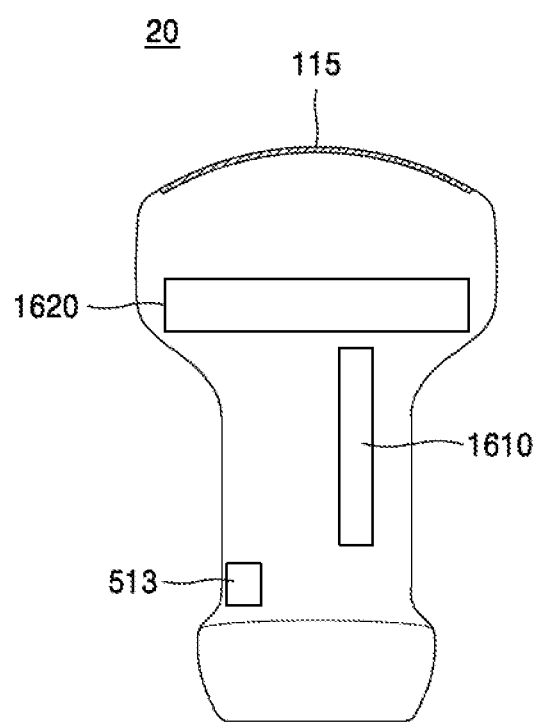
FIG. 16 is a diagram showing a moisture vulnerable area of a probe, according to an embodiment.

FIG. 16 is a diagram showing moisture vulnerable areas of the probe 20 according to an embodiment.

The moisture vulnerable areas may be areas where water leakage easily occurs in the probe 20. The moisture vulnerable areas may be areas where cracks are present, making it easier for moisture to penetrate the inside of the probe 20. The moisture vulnerable areas may include a first moisture vulnerable area 1610 and a second moisture vulnerable area 1620. However, the moisture vulnerable areas are not limited thereto, and may also include an area where the charging terminal 513, which is susceptible to water leakage into the probe 20, is positioned.

The first moisture vulnerable area 1610 may include a high voltage path. The high voltage path may be a path through which high voltage is applied or is stored. The high voltage path may be a path including a wire connecting the switching circuit 520 to the pulse circuit 530 through which high voltage flows. The high voltage path may be a path including the capacitor 540 where the high voltage is stored. The second moisture vulnerable area 1620 may be a battery socket. The battery socket may be a socket into which the battery 511 is inserted.

Figure 17:
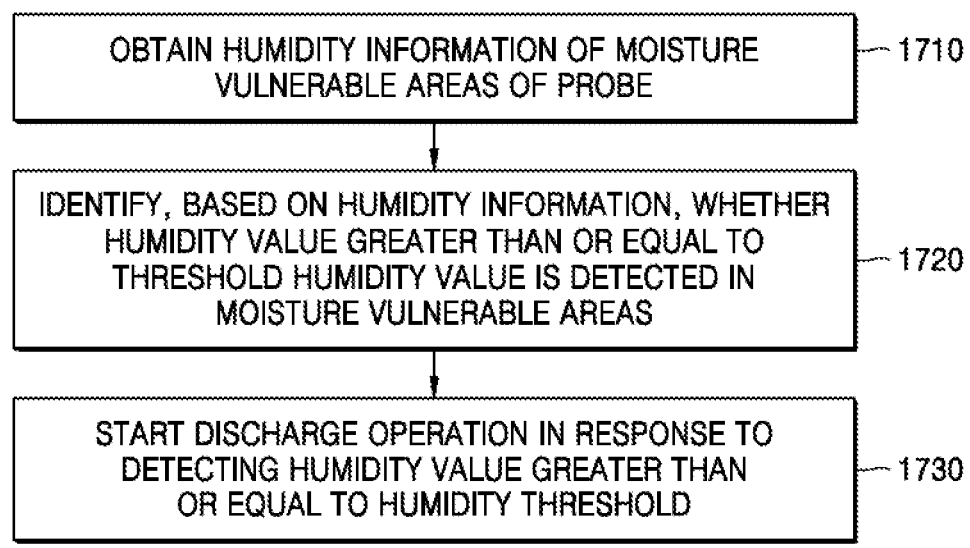
FIG. 17 is a flowchart illustrating a water leakage event occurring to a probe, according to an embodiment.

FIG. 17 is a flowchart illustrating a water leakage event occurring in the probe 20, according to an embodiment.

According to an embodiment, in operation 1710, the probe 20 may obtain humidity information of the first and second moisture vulnerable areas 1610 and 1620 of the probe 20. The probe 20 may include a sensor module including a humidity sensor. The humidity sensor may measure humidity in the first and second moisture vulnerable areas 1610 and 1620. The probe 20 may obtain humidity information of the first and second moisture vulnerable areas 1610 and 1620 by using the humidity sensor.

According to an embodiment, in operation 1720, the probe 20 may identify, based on the humidity information, whether a humidity value greater than or equal to a threshold humidity value is detected in the first and second moisture vulnerable areas 1610 and 1620. The probe 20 may identify whether humidity values of the first and second moisture vulnerable areas 1610 and 1620 are greater than or equal to the threshold humidity value based on the obtained humidity information.

According to an embodiment, in operation 1730, the probe 20 may start a discharge operation in response to detecting the humidity value greater than or equal to the threshold humidity value. When the humidity value greater than or equal to the threshold humidity value is detected, the probe 20 may determine that water leakage has occurred in the probe 20. When the humidity value greater than or equal to the threshold humidity value is detected, the probe 20 may start a discharge operation by using the discharging module 550.

Figure 18:
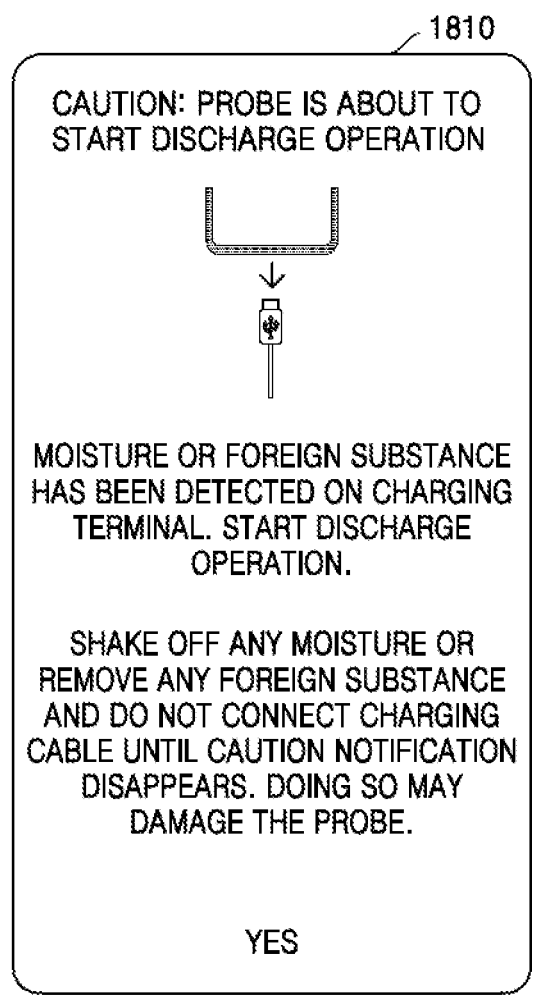
FIG. 18 is a diagram illustrating a water leakage event UI for a probe, according to an embodiment.

FIG. 18 is a diagram illustrating a water leakage event UI 1810 for the probe 20, according to an embodiment.

When a humidity value greater than or equal to a threshold humidity value is detected, the probe 20 may determine that water leakage has occurred in the probe 20. When determining that the water leakage has occurred, the probe 20 may display the water leakage event UI 1810. The water leakage event UI 1810 may instruct the user to be careful because the probe 20 is about to start a discharge operation. The water leakage event UI 1810 may instruct the user to separate a charger from the probe 20. The water leakage event UI 1810 may inform the user that moisture or a foreign substance has been detected on the charging terminal 513. However, the water leakage event UI 1810 is not limited thereto, and the water leakage event UI 1810 may inform the user that moisture or foreign substance has been detected in the first and second moisture vulnerable areas 1610 and 1620. The water leakage event UI 1810 may instruct the user to shake off the moisture or remove the foreign substance and not to connect a charging cable until a caution notification disappears.

The disclosure provides a wireless ultrasound probe and a control method thereof capable of reducing damage to the wireless ultrasound probe even when events such as a change in bias voltage, a fall, and water leakage occur to the wireless ultrasound probe.

The wireless ultrasound probe 20 according to the disclosure may include the battery circuit 510, the switching circuit 520 electrically connected to the battery circuit 510, the pulse circuit 530 electrically connected to the switching circuit 520 to output a transmission signal including a pulse voltage, the transducer 115 configured to transmit an ultrasound signal to an object by receiving the transmission signal, the capacitor 540 electrically connected to the pulse circuit 530, and the discharge module 550 electrically connected to the capacitor 540. According to an embodiment, the switching circuit 520 may be configured to generate a high voltage used by the pulse circuit 530 to output the transmission signal and store the high voltage in the capacitor 540. According to an embodiment, the discharge module 550 may be configured to detect whether a first event has occurred that causes damage to the wireless ultrasound probe 20 due to the high voltage stored in the capacitor 540. According to an embodiment, the discharge module 550 may be configured to, in response to detecting the first event, start a discharge operation for discharging the high voltage stored in the capacitor 540.

According to an embodiment, the first event may include a change in a bias voltage related to a magnitude of the transmission signal.

According to an embodiment, the switch 551 may be provided between the capacitor 540 and the discharge module 550. According to an embodiment, in response to detecting the first event, the discharge module 550 may be configured to transmit a closing control signal to the switch 551. According to an embodiment, the discharge module 550 may be configured to discharge the high voltage stored in the capacitor 540.

According to an embodiment, the discharge module 550 may be configured to transmit the high voltage stored in the capacitor 540 to the battery circuit 510.

According to an embodiment, in response to detecting the first event, the discharge module 550 may be configured to transmit, to the pulse circuit 530, a dummy control signal that causes the pulse circuit 530 to output a dummy signal. According to an embodiment, in response to receiving the dummy control signal, the pulse circuit 530 may transmit a dummy signal to allow the discharge module 550 to discharge the high voltage stored in the capacitor 540.

According to an embodiment, the first event may include a fall of the wireless ultrasound probe 20.

According to an embodiment, the wireless ultrasound probe 20 may include the receiver module 117 configured to generate ultrasound data based on reception signals that the transducer 115 receives from the object. According to an embodiment, the wireless ultrasound probe 20 may include a sensor module. According to an embodiment, the sensor module may be configured to obtain position information of the wireless ultrasound probe 20. According to an embodiment, the sensor module may be configured to detect whether the wireless ultrasound probe 20 is falling, based on the position information and the ultrasound data.

According to an embodiment, the sensor module may be configured to detect whether an impact due to the fall has occurred. According to an embodiment, the discharge module 550 may be configured to identify whether the damage to the wireless ultrasound probe 20 is detected. According to an embodiment, the discharge module 550 may be configured to transmit, to a terminal, confirmation information related to discontinuing use of the wireless ultrasound probe 20 when the damage is detected.

According to an embodiment, the first event may include water leakage in the wireless ultrasound probe 20.

According to an embodiment, the wireless ultrasound probe 20 may include a sensor module. According to an embodiment, the sensor module may be configured to obtain humidity information of the first moisture vulnerable area 1610 and the second moisture vulnerable area 1620 of the wireless ultrasound probe 20. According to an embodiment, the sensor module may be configured to identify, based on the humidity information, whether a humidity value greater than or equal to a threshold humidity value is detected in the first moisture vulnerable area 1610 and the second moisture vulnerable area 1620.

A control method of a wireless ultrasound probe according to the disclosure may include generating, by the wireless ultrasound probe, a high voltage for outputting a transmission signal and storing the high voltage in a capacitor. The control method of the wireless ultrasound probe may include detecting, by the wireless ultrasound probe, whether a first event has occurred that causes damage to the wireless ultrasound probe due to the high voltage stored in the capacitor. The control method of the wireless ultrasound probe may include, in response to detecting the first event, starting, by the wireless ultrasound probe, a discharge operation for discharging the high voltage stored in the capacitor.

According to an embodiment, the first event may include a change in a bias voltage related to a magnitude of the transmission signal.

According to an embodiment, the starting of the discharge operation may include transmitting, by a discharge module of the wireless ultrasound probe, a closing control signal to a switch of the wireless ultrasound probe in response to detecting the first event. According to an embodiment, the starting of the discharge operation may include discharging, by the discharge module, the high voltage stored in the capacitor.

According to an embodiment, the discharging, by the discharge module, of the high voltage stored in the capacitor may include transmitting the high voltage stored in the capacitor to a battery circuit.

According to an embodiment, the starting of the discharge operation may include, in response to detecting the first event, transmitting, by the discharge module of the wireless ultrasound probe, to a pulse circuit of the wireless ultrasound probe, a dummy control signal used to output a dummy signal. According to an embodiment, the starting of the discharge operation may include, in response to receiving the dummy control signal, transmitting, by the pulse circuit, a dummy signal to allow the discharge module to discharge the high voltage stored in the capacitor.

According to an embodiment, the first event may include a fall of the wireless ultrasound probe.

According to an embodiment, the detecting of whether the first event has occurred may include obtaining position information of the wireless ultrasound probe. According to an embodiment, the detecting of whether the first event has occurred may include detecting whether the wireless ultrasound probe is falling, based on the position information and ultrasound data generated based on reception signals received by the wireless ultrasound probe.

According to an embodiment, after the starting of the discharge operation, the control method of the wireless ultrasound probe may include detecting whether an impact due to the fall has occurred. According to an embodiment, the control method of the wireless ultrasound probe may include identifying whether the damage to the wireless ultrasound probe is detected. According to an embodiment, the control method of the wireless ultrasound probe may include transmitting, to a terminal, confirmation information related to discontinuing use of the wireless ultrasound probe when the damage is detected.

According to an embodiment, the first event may include water leakage in the wireless ultrasound probe.

According to an embodiment, the detecting of whether the first event has occurred may include obtaining humidity information of a moisture vulnerable area of the wireless ultrasound probe. According to an embodiment, the detecting of whether the first event has occurred may include identifying, based on the humidity information, whether a humidity value greater than or equal to a threshold humidity value is detected in the moisture vulnerable area.

A probe and control method thereof according to the disclosure are capable of quickly discharging the high voltage stored in the capacitor, thereby reducing damage to the probe even when events such as a change in bias voltage, a fall, and water leakage occur to the probe.

An apparatus, method, or computer program according to an embodiment performs operations related to AI. Operations related to AI are performed via a processor and a memory. The processor may use one or a plurality of processors to perform operations related to AI. In this case, the one or plurality of processors may be a general-purpose processor such as a central processing unit (CPU), an application processor (AP), a digital signal processor (DSP), etc., a dedicated graphics processor such as a graphics processing unit (GPU), a vision processing unit (VPU), etc., or a dedicated AI processor such as a neural processing unit (NPU). The one or the plurality of processors process input data according to programs, instructions, or AI models stored in memory.

The programs, instructions, or AI models may be created via machine learning. In this case, the creation via the machine learning that the programs, instructions, or AI models designed to perform desired characteristics (or purposes) are created by training basic AI models based on a large number of training data via learning algorithms. The machine learning may be performed by an apparatus itself in which AI is performed or via a separate server and/or system. Examples of a learning algorithm may include, but are not limited to, supervised learning, unsupervised learning, semi-supervised learning, and reinforcement learning.

An AI model may consist of a plurality of neural network layers. Each of the plurality of neural network layers has a plurality of weight values and performs neural network computations via calculations between a result of computations in a previous layer and the plurality of weight values. The plurality of weight values assigned to each of the plurality of neural network layers may be optimized by a result of training the AI model. An artificial neural network may include a deep neural network (DNN), and may be, for example, but is not limited to, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQNs).

A machine-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer in which data is temporarily stored.

According to an embodiment, methods according to embodiments may be included in a computer program product when provided. The computer program product may be traded, as a product, between a seller and a buyer. The computer program product may be distributed in the form of a machine-readable storage medium (e.g., compact disc read only memory (CD-ROM)) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the machine-readable storage medium such as memory of a server of a manufacturer, a server of an application store, or a relay server.

What is claimed is:

1. A wireless ultrasound probe comprising:
   a battery circuit;
   a switching circuit electrically connected to the battery circuit;
   a pulse circuit electrically connected to the switching circuit to output a transmission signal including a pulse voltage;
   a transducer configured to transmit an ultrasound signal to an object by receiving the transmission signal;
   a capacitor electrically connected to the pulse circuit; and
   a discharge module electrically connected to the capacitor,
   wherein the switching circuit is configured to
   generate a high voltage used by the pulse circuit to output the transmission signal and store the high voltage in the capacitor, and
   the discharge module is configured to
   detect whether a first event has occurred that causes damage to the wireless ultrasound probe due to the high voltage stored in the capacitor, and in response to detecting the first event, start a discharge operation for discharging the high voltage stored in the capacitor,
wherein a switch is provided between the capacitor and the discharge module, and
the discharge module is further configured to:
 transmit a closing control signal to the switch in response to detecting the first event, and
 discharge the high voltage stored in the capacitor.

2. The wireless ultrasound probe of claim 1, wherein the first event comprises a change in a bias voltage related to a magnitude of the transmission signal.

3. The wireless ultrasound probe of claim 1, wherein the discharge module is further configured to transmit the high voltage stored in the capacitor to the battery circuit.

4. The wireless ultrasound probe of claim 1, wherein the discharge module is further configured to,
in response to detecting the first event, transmit, to the pulse circuit, a dummy control signal that causes the pulse circuit to output a dummy signal, and
the pulse circuit is configured to,
in response to receiving the dummy control signal, transmit the dummy signal to allow the discharge module to discharge the high voltage stored in the capacitor.

5. The wireless ultrasound probe of claim 1, wherein the first event comprises a fall of the wireless ultrasound probe.

6. The wireless ultrasound probe of claim 5, further comprising:
a receiver module configured to generate ultrasound data based on reception signals that the transducer receives from the object; and
a sensor module,
wherein the sensor module is configured to
obtain position information of the wireless ultrasound probe, and
detect whether the wireless ultrasound probe is falling, based on the position information and the ultrasound data.

7. The wireless ultrasound probe of claim 6, wherein
the sensor module is further configured to
detect whether an impact due to the fall has occurred, and
the discharge module is further configured to
identify whether the damage to the wireless ultrasound probe is detected, and
transmit, to a terminal, confirmation information related to discontinuing use of the wireless ultrasound probe when the damage is detected.

8. The wireless ultrasound probe of claim 1, wherein the first event comprises water leakage in the wireless ultrasound probe.

9. The wireless ultrasound probe of claim 8, further comprising
a sensor module configured to
obtain humidity information of a moisture vulnerable area of the wireless ultrasound probe, and
identify, based on the humidity information, whether a humidity value greater than or equal to a threshold humidity value is detected in the moisture vulnerable area.

10. A control method of a wireless ultrasound probe, the control method comprising:
generating, by the wireless ultrasound probe, a high voltage for outputting a transmission signal and storing the high voltage in a capacitor;
detecting, by the wireless ultrasound probe, whether a first event has occurred that causes damage to the wireless ultrasound probe due to the high voltage stored in the capacitor; and
in response to detecting the first event, starting, by the wireless ultrasound probe, a discharge operation for discharging the high voltage stored in the capacitor,
wherein the starting of the discharge operation comprises
 transmitting, by a discharge module of the wireless ultrasound probe, a closing control signal to a switch of the wireless ultrasound probe in response to detecting the first event; and
 discharging, by the discharge module, the high voltage stored in the capacitor.

11. The control method of claim 10, wherein the first event comprises a change in a bias voltage related to a magnitude of the transmission signal.

12. The control method of claim 10, wherein the discharging, by the discharge module, of the high voltage stored in the capacitor comprises transmitting the high voltage stored in the capacitor to a battery circuit.

13. The control method of claim 10, wherein
the starting of the discharge operation comprises:
in response to detecting the first event, transmitting, by the discharge module of the wireless ultrasound probe, to a pulse circuit of the wireless ultrasound probe, a dummy control signal used to output a dummy signal; and
in response to receiving the dummy control signal, transmitting, by the pulse circuit, the dummy signal to allow the discharge module to discharge the high voltage stored in the capacitor.

14. The control method of claim 10, wherein the first event comprises a fall of the wireless ultrasound probe.

15. The control method of claim 14, wherein
the detecting of whether the first event has occurred comprises:
obtaining position information of the wireless ultrasound probe; and
detecting whether the wireless ultrasound probe is falling, based on the position information and ultrasound data generated based on reception signals received by the wireless ultrasound probe.

16. The control method of claim 15, after the starting of the discharge operation, further comprising:
detecting whether an impact due to the fall has occurred;
identifying whether the damage to the wireless ultrasound probe is detected; and
transmitting, to a terminal, confirmation information related to discontinuing use of the wireless ultrasound probe when the damage is detected.

* * * * *